(12) United States Patent
Chender et al.

(10) Patent No.: US 6,993,515 B2
(45) Date of Patent: Jan. 31, 2006

(54) INTELLIGENCE SYSTEM AND A METHOD OF GENERATING FLAGS FOR USE THEREIN

(75) Inventors: Michael Chender, Halifax (CA); Walter Fordham, Halifax (CA); Leo Richard Marrs, Jr., Livermore, CA (US)

(73) Assignee: Coemergence Inc., Halifax (CA)

( * ) Notice: Subject to any disclaimer, the term of this patent is extended or adjusted under 35 U.S.C. 154(b) by 517 days.

(21) Appl. No.: 09/953,829

(22) Filed: Sep. 17, 2001

(65) Prior Publication Data

US 2003/0055815 A1 Mar. 20, 2003

(51) Int. Cl.
*G06F 17/00* (2006.01)
*G06F 17/30* (2006.01)

(52) U.S. Cl. .............................. 707/1; 707/100; 706/45
(58) Field of Classification Search ................ 707/1–4, 707/7, 10, 100, 200; 706/45, 52
See application file for complete search history.

(56) References Cited

U.S. PATENT DOCUMENTS

2002/0019842 A1 * 2/2002 Law ............................... 709/1
2002/0178360 A1 * 11/2002 Wenocur et al. ............ 713/170

OTHER PUBLICATIONS

"User's Notes for the Beta–Test Version of the Acquisitions Intelligence System For Billiton International Development," Metals Economics Group, Eastern Resource Capital, Halifax, Nova Scotia, Apr. 7, 1999.
"Intelligence Software: Reality or Still Virtual Reality?," "Intelligence Software Report™ 2000," Fuld & Company, Inc., Cambridge, MA.

* cited by examiner

*Primary Examiner*—Alford W. Kindred
(74) *Attorney, Agent, or Firm*—Duane Morris LLP

(57) ABSTRACT

The present invention relates to a system and method for collecting and analyzing intelligence data regarding events, organizations and other entities, relevant to a specific individual or organizational goal or function. To facilitate analysis of intelligence data by a user, flags that describe a condition are defined, where a condition can be a state or event, or a predictor of a future state or future event. Data items of various types are stored in one or more databases, and can be associated with flags. Data items and flags can be subsequently searched together by users. In one aspect of the invention, there is provided a method of generating flags where the flags include early warning signals used to predict the occurrence of a specified scenario. In another aspect of the invention, there is provided a method of generating flags where the flags include value indicators used to identify value in context objects such as an asset in an industry of interest. The flags can then be employed in an intelligence system that is configured to collect intelligence data, and which provides means for users to analyze the data to help them in achieving a specified strategic goal. The present invention can be applied to any industry of interest.

50 Claims, 12 Drawing Sheets

| Asset Flags Category | Total Flags |
|---|---|
| IN PLAY | 1 |
| EARLY WARNING SIGNALS - ASSET | 2 |
| VALUE INDICATORS | 4 |
| COMPETITOR ACTIVITY | 0 |
| OTHER | 0 |

| Asset Flags | Flag | User | Date | Action |
|---|---|---|---|---|
| IN PLAY | | | | |
| Owner wants to Sell/Looking for Partner | ⚑ | RSB | 6-19-2001 | |
| Discussions Under Way | | | | |
| Discussions in Difficulty | | | | |
| Discussions Recently Terminated | | | | |
| Looking for Financing | | | | |
| Seen As Target | | | | |
| EARLY WARNING SIGNALS - ASSET | | | | |
| Problems with Government | | | | |
| Development/Operating Problems | | | | |
| Problems Between Partners | | | | |
| Too Many Partners | | | | |
| Ownership Interests Recently Changed | ⚑ | DR | 5-10-2001 | |
| Ownership Rights Expiring | | | | |
| Excessive Risk Exposure | ⚑ | PRT | 3-18-2001 | |
| Scope or Interest Too Small | | | | |
| Owner not an Operator | | | | |
| Not a Core Holding | | | | |
| VALUE INDICATORS | | | | |
| Potential to Lower Capital Costs | | | | |
| Potential to Lower Operating Costs | | | | |
| Potential to Lower Exploration Risk | | | | |
| Potential to Lower Development Risk | | | | |
| Solvable Problems | | | | |
| Political Instability/Security Problems | | | | |
| Potential to Increase Production | ⚑ | LZR | 5-11-2001 | |
| Enhanced Recovery Opportunities | ⚑ | LPT | 5-04-2001 | |
| Low Assessment of Value | | | | |
| Significant Undeveloped Reserves | | | | |
| Upside Potential | | | | |
| Favorable Geology | | | | |
| Different Geological Interpretation | | | | |
| Significant Underdeveloped Land Position | ⚑ | MCT | 7-7-2001 | |
| Good Fit | ⚑ | MCT | 7-7-2001 | |
| COMPETITOR ACTIVITY | | | | |
| Companies Targeting This Asset | | | | |
| OTHER | | | | |
| Other Comments | | | | |

230 — (Early Warning Signals - Asset section)
232 — (Value Indicators section)

FIG. 10A

ACQUISITION AND COMPETITOR INTELLIGENCE SYSTEM

| Home | Intelligence | News | Assets | Companies | Countries |

New Search | Display Search | Saved Searches | Asset Detail | Reports

Profile
BCAM-036

Flags | Profile | Documents | Operator Profile | Search News | Search Web

[Add To List]

234

| | |
|---|---|
| Country: | Brazil (Yellow) |
| Region: | Latin America |
| State: | Bahia |
| Basin: | Camamu |
| Activity Status: | Production |
| Operator: | Devon |
| Owners: | Devon 60%, Sipetrol 20%, Petrobras 20% |
| Asset Type: | Conventional Gas |
| Physical Environment: | Offshore |
| Gas In Place, BCF: | 400 |
| Recent Production Rate, MMCFD: | 40 |
| Number of Wells: | 12 |

FIG. 10B

INTELLIGENCE SYSTEM AND A METHOD OF GENERATING FLAGS FOR USE THEREIN

FIELD OF THE INVENTION

The present invention relates to a system and method of collecting and analyzing data, and is more particularly concerned with a computer-based system and method for analyzing intelligence data to facilitate decision-making.

BACKGROUND OF THE INVENTION

The formal and informal attempts or efforts that all companies make to handle and analyze information critical to the operation of their business may be referred to collectively as Knowledge Management. Where actionable information about factors in the market environment that could affect a company's competiveness is involved, these efforts are often more specifically referred to as Competitive Intelligence (CI) or Business Intelligence (BI).

One goal of these efforts is to link apparently unrelated signals, events, and perceptions into patterns and trends concerning the environment in which a company operates. This is a practice which is performed, to the extent possible, by senior executives and analysts in a company to better understand how the company's products or services may be more effectively positioned in the marketplace.

Rapid developments in information technology have had a significant impact on the competitive environment in which companies operate. These developments have made data critical to CI, BI, and decision-making more accessible to participants in the marketplace. However, while companies are facing more pressing needs for timely, useful information, the overabundance of available data has made it increasingly difficult for companies and their decision-makers to sift through the data and to extract that which might be relevant to them.

CI and BI are particularly important in the area of mergers and acquisitions (M&A), for example. Increasing market pressure and competition have given rise to both pressure for growth and to valuable opportunities for many companies to acquire desirable assets of other companies. Unfortunately, many opportunities may fail to deliver significant value to shareholders of the acquiring company. Many opportunities are never seen as such or acted on, as those opportunities are not known or identified as opportunities until it is too late for effective action. At the same time, there may not be an opportunity for a full and proper understanding of the ramifications of a proposed acquisition in the limited time frame in which a decision often needs to be made.

In these situations, there is typically a high dependence on readily available information, and how that information is used to forecast the fit of the acquired company and the value of its assets. The ability of a company to identify an attractive target before its competitors, or to find value where its competitors might not, is critical to a successful acquisition.

Traditionally, many companies that are looking to grow have gathered information that may be required to achieve these objectives through informal processes. These may consist of monitoring public sources (e.g. the Internet), using consultants, talking to brokers and investment bankers, or informally sharing information internally through meetings or electronic mail, for example.

A more sophisticated method of gathering the required information is to use an application such as Lotus Notes™ that permits a group of users to share information and insights with each other. Other software applications, known as groupware applications, facilitate group interaction and may be used to support more or less formalized efforts to procure potentially useful information from employees of a company.

A number of commercially available generic intelligence applications have been developed that attempt to make the intelligence process more efficient than traditional methods. For example, Knowledge.Works™ and Wisdom Builder™ are applications that are used to collect and report information for companies. The problem with these generic intelligence applications is that some key areas of the intelligence process are not effectively addressed, including in particular, the effective solicitation of information from employees on an ongoing basis, the placing of that information in a context that would make its importance more apparent, and the analysis of the solicited information to make it relevant for action.

One improved system developed by the assignee of the present invention, referred to as the Acquisitions Intelligence System v.2.1 (AIS), attempted to resolve some of the inefficiencies of prior art applications and systems. AIS is a knowledge management system designed specifically for the mining industry. AIS aids in collecting and collating information, and was primarily designed to use that information in determining whether a target project, target project holding, or target company in the mining industry may be a potential candidate for a merger or acquisition. This information is collected from employees of the company utilizing AIS, and in addition to technical information on a target company or entity (e.g. the target of a potential acquisition), the information includes other forms of other information such as rumors or gossip. In addition to the information collected by employees, AIS also obtains information from the Metals Economics Group's MineSearch™ database, an industry standard for information on current mining projects.

Furthermore, AIS utilizes a checklist of situations or developments for each target project holding, or target company under analysis, to serve as clues as to their suitability or level of desirability as a candidate for acquisition. These checklists are developed by the designer of AIS, and are preprogrammed into AIS. AIS does not permit users to modify the checklists.

AIS has limited applicability in industries other than mining, as the checklists used by AIS relate strictly to the task of identifying a suitable candidate in the mining industry for a merger or acquisition. While the designer of AIS takes into consideration events or other clues that he believes may be critical to the process of identifying suitable acquisition candidates in the mining industry in creating the checklists for AIS, no well-defined methodology or algorithm is used to create these checklists. Since such a defined methodology is not used to create the checklists, it is extremely difficult, if not impossible to modify AIS, which is designed for M&A applications in the mining industry, for use in other dissimilar applications. AIS is also limited in the sources of information it relies upon, namely employees of the user company, and a database populated specifically with data on mining projects.

Thus, there exists a need for an effective intelligence system that may be used in a variety of industries, and that it is not limited for use in the mining industry. Such a system would deal with the analysis of information on a variety of business issues, and would not be restricted to mergers and acquisitions applications. The present invention is designed to overcome at least some of the deficiencies of the above prior art systems.

SUMMARY OF THE INVENTION

The present invention relates generally to a system and method of collecting and analyzing intelligence data. More specifically, the present invention relates to a system and method of collecting and analyzing intelligence data regarding events, organizations and other entities, relevant to a specific individual or organizational goal or function.

In one aspect of the invention, the present invention relates to a method of generating flags for use in an intelligence system, comprising the steps of: defining a plurality of flags, wherein each of the plurality of flags has a specific condition associated therewith; and storing the plurality of flags in a storage medium, wherein each of the plurality of flags has a flag status indicator associated therewith, and wherein the plurality of flags are searchable by a search engine.

In another aspect of the invention, the present invention relates to a method of generating flags where a plurality of early warning signals are defined by performing the following steps: identifying a strategic goal; identifying one or more scenarios associated with the strategic goal; identifying one or more examples of past occurrences of at least one of the one or more scenarios; for each of the one or more examples of past occurrences, identifying a plurality of conditions that have been satisfied within a specified period of time prior to the occurrence thereof; determining a plurality of reliable indicators that at least one of the one or more scenarios will occur, wherein the plurality of reliable indicators is a subset of the plurality of conditions; and defining a plurality of early warning signals, wherein each of the plurality of early warning signals is a descriptor of a reliable indicator of the plurality of reliable indicators.

In another aspect of the invention, the present invention relates to a method of collecting and analyzing intelligence data relating to one or more predefined context objects, wherein each of the one or more predefined context objects has a plurality of context object attributes associated therewith, the method comprising the steps of: displaying at least one flag of a plurality of flags to one or more first users, wherein each of the plurality of flags has a specific condition associated therewith, wherein each of the plurality of flags is associated with a context object of the one or more predefined context objects, wherein each of the plurality of flags has a flag status indicator associated therewith, and wherein each of the one or more first users is permitted to assign a value to the flag status indicator associated with at least one displayed flag; receiving a first plurality of data items from one or more second users, whereby the first plurality of data items can be characterized as Primary Source data; and associating each of the first plurality of data items with at least one of the plurality of flags or at least one of the one or more predefined context objects.

In another aspect of the invention, the present invention relates to a system for generating flags, the system comprising: a database for storing a plurality of flags; a user interface; and one or more processing modules connected to the database and the user interface, wherein the one or more processing modules are programmed to define a plurality of flags from input received from a user through the user interface and to store the plurality of flags in the database, wherein each of the plurality of flags has a specific condition associated therewith, and wherein each of the plurality of flags has a flag status indicator associated therewith.

In another aspect of the invention, the present invention relates to an intelligence system for collecting and analyzing intelligence data relating to one or more predefined context objects, wherein each of the one or more predefined context objects has a plurality of context object attributes associated therewith, the system comprising: a system database for storing a plurality of flags, a first plurality of data items, and a plurality of context object attributes associated with the plurality of predefined context objects; a user interface; and one or more processing modules connected to the system database and the user interface, for displaying at least one flag of a plurality of flags to one or more users through the user interface, wherein each of the one or more first users is permitted to assign a value to the flag status indicator associated with at least one displayed flag, and receiving the first plurality of data items from one or more users for storage in the system database and associating each of the first plurality of data items with at least one of the plurality of flags or at least one of the one or more predefined context objects.

The present invention relates to a computer-based system and method for analyzing both "hard" data and "soft" data, as defined herein, to facilitate decision-making, and which allow users to identify opportunities for satisfying a user-defined strategic goal. The present invention is flexible in that it relates to a system and method that can be adapted for use in analyzing data relevant to any specified strategic goal relating to any industry.

In accordance with the present invention, a set of flags are defined in accordance with a specific methodology. An intelligence system may be configured to generate flags for subsequent use, or a set of predefined flags may already exist for use by the intelligence system. Flags are descriptors that describe a "condition" that may or may not be satisfied. The condition may be a state that may have come to pass or an event that may have occurred, or a predictor of a future state that may come to pass in the future or of a future event that may occur in the future. Data items characterized as either Primary Sources or Secondary Sources of data can be associated with one or more flags. For example, a flag may be an early warning signal that indicates whether an event has or has not occurred, which can be then be used to predict the occurrence of some predefined scenario. The process of defining flags in an embodiment of the present invention is based, in part, on information received from a user with knowledge of occurrences of historical or past events in a selected industry of interest. Advantageously, this embodiment of the present invention inherently facilitates customization of an intelligence system to the selected industry of interest, unlike some prior art generic Competitive Intelligence and Business Intelligence systems.

Furthermore, an intelligence system in an embodiment of the present invention also provides for enhanced data search, storage, and retrieval capabilities, including the linking of documents and news to predefined context objects (e.g. an asset or a company), and the searching of text documents, Primary Sources and Secondary Sources of data, and flags. The intelligence system may also provide for a user-friendly user interface for receiving input from and providing output to one or more users, and facilitate access to the intelligence system through electronic mail.

BRIEF DESCRIPTION OF THE DRAWINGS

For a better understanding of the present invention, and to show more clearly how it may be carried into effect, reference will now be made, by way of example, to the accompanying drawings which show preferred embodiments of the present invention, and in which:

FIG. 9 is an example of a news page displayed to a user in an example implementation of an intelligence system in an embodiment of the present invention;

FIG. 10A is an example of a flags chart displayed to a user where a set of predefined flags are shown in an example implementation of an intelligence system in an embodiment of the present invention;

FIG. 10B is an example of a profile page displayed to a user in an example implementation of an intelligence system in an embodiment of the present invention.

DETAILED DESCRIPTION OF THE PREFERRED EMBODIMENTS

Figure 1:
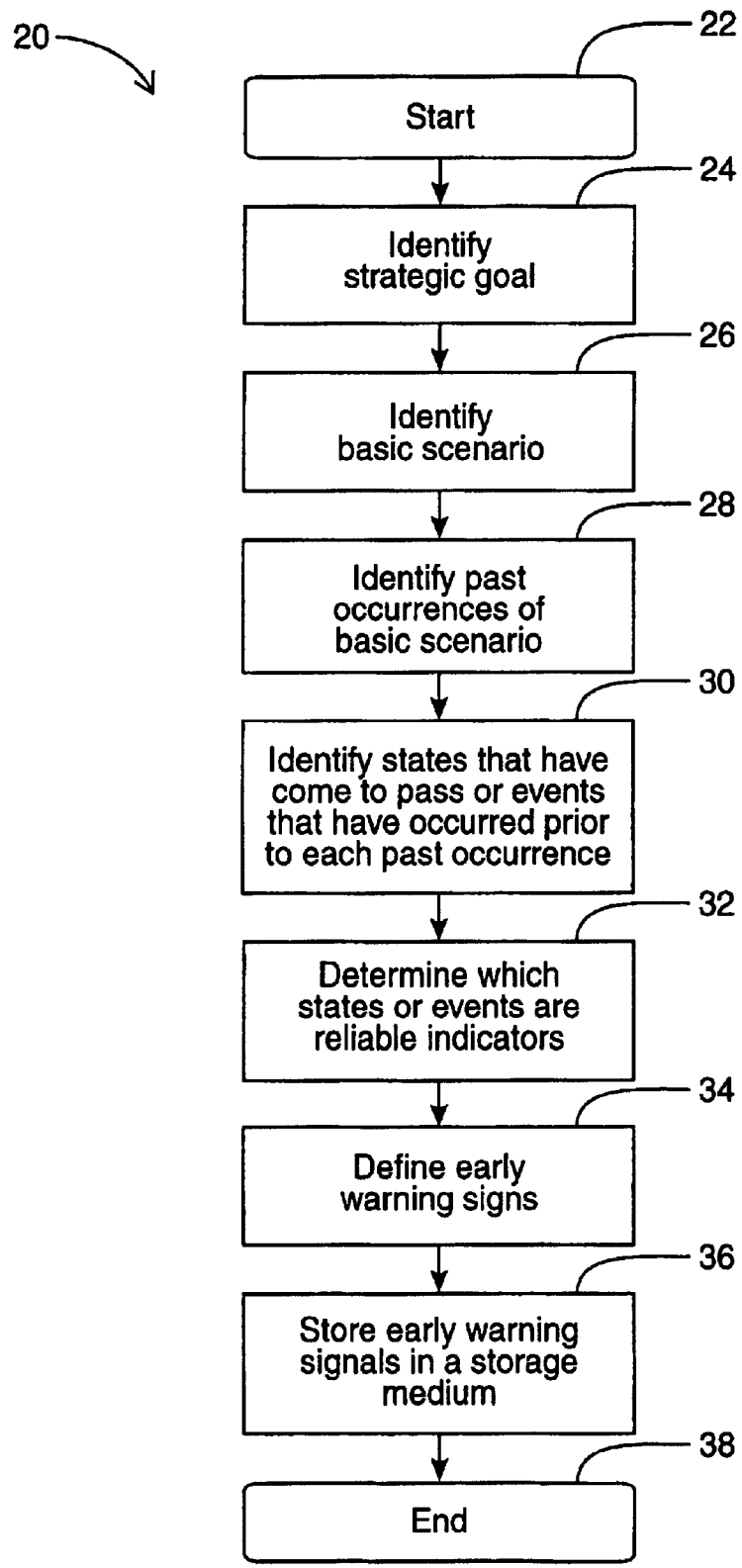
FIG. 1 is a flowchart illustrating the steps of an embodiment of a method of defining early warning signals.

The present invention relates to a system and method of collecting and analyzing intelligence data regarding events, organizations and other entities, relevant to a specific individual or organizational goal or function.

In accordance with the present invention, a discrete set of "flags" is defined or generated, for subsequent use in an intelligence system in accordance with a specific methodology, as described herein. An intelligence system may be configured to generate flags for subsequent use, or a set of predefined flags may already exist for use by the intelligence system. The act of defining or generating flags may also be referred to as "engineering" flags in this specification.

Each flag is associated with a "condition"; a condition may viewed as a specific state, event, or predictor. In the specification and in the claims, we define a condition as follows:

(1) A condition can be a state that may have come to pass, an event that may have occurred, a predictor of a future state that may come to pass in the future, or a predictor of a future event that may occur in the future. Typically, the predictor itself will also be a state or event (2) A condition is considered to be satisfied if the condition is a state and that state has come to pass, or if the condition is an event and that event has occurred.

Accordingly, flags can be indicators of a state of being, a state of activity, a state of fit, or a state of development in a particular direction, for example. Flags can describe a present state (i.e. a state that currently exists or conversely a state that does not currently exist), or they can describe a predictor of a future state (i.e. some state or event that suggests that some future state or future event will transpire).

A flag status indicator is associated with each flag to indicate whether the underlying condition associated with the flag has been satisfied (i.e. the relevant state associated with the flag has come to pass, or the relevant event associated with the flag has occurred). The value of the flag status indicator can be set to reflect a "flagged" status of the associated flag, which indicates that the underlying condition associated with the flag has been satisfied. Conversely, the value of the flag status indicator may be set to reflect an "unflagged" status of the associated flag, which indicates that the underlying condition associated with the flag has not yet been satisfied (i.e. the relevant state associated with the flag has not yet come to pass or currently does not exist, or the relevant event associated with the flag has not yet occurred). It will be obvious to those skilled in the art that the flag status indicator may be implemented in a variety of ways (e.g. as a Boolean variable), and any known means for indicating the status of a flag may be implemented as a flag status indicator for the flag.

In a preferred embodiment of the invention, flag status indicators are assigned values that are initially set to reflect an unflagged status, but the values of the flag status indicators can be subsequently changed by a user. For example, if a user of an intelligence system determines, from his own personal knowledge or by looking at intelligence data available to him, that an event associated with a specific flag has occurred, the user can set the value of the corresponding flag status indicator to reflect a flagged status to indicate to other users of the intelligence system, that the event has occurred. While the value of a flag status indicator can be set to reflect either a flagged status or an unflagged status in this embodiment of the invention, other values to reflect other different status categories may be defined and assigned to flag status indicators. For instance, flag status indicators may also be assigned values corresponding to a predefined scale or range. The scale may be numerical (e.g. with values being decimal or floating-point values), ordinal, or some other defined scale. The scale can be used to allow a "weight" to be associated with a flag, which may be a measure of importance or a measure of completeness. In other words, different values of a flag status indicator may be used to reflect the different degrees to which the condition underlying the associated flag has been satisfied.

Some flags and flags status indicators may also be defined in an alternative manner such that when the value of a flag status indicator associated with a particular flag is set to reflect a "flagged" status, that status indicates that an associated state will not come to pass or that an associated event will not occur.

Different sets of flags can be defined and generated for different applications, relating to different industries of interest. The method of defining and generating flags in accordance with the present invention, is not restricted for use in applications relating to a particular industry or industry segment, nor to any particular type of process or function.

One category of flags that may be engineered in accordance with the present invention are referred to in the specification and in the claims as "early warning signals". An early warning signal is a descriptor of a specific condition (i.e. a state or event), which can be used, either alone or in combination with other early warning signals, to predict the occurrence of a specified scenario (e.g. an event or a series of events) that may occur in the future. Accordingly, early warning signals act as "clues" that one or more specific future states will come to pass or that one or more specific future events will occur as defined by the specified scenario. These early warning signals may be defined by an implementer of an intelligence system in which early warning signals are used, or by one or more users of the intelligence system, based on their personal experiences and a study of past (i.e. historical) occurrences of the specified scenario.

The specified scenario is typically related to a specific strategic goal in the context of a particular industry. For example, the users of an intelligence system in which early warning signals are implemented as flags, may be employees of a company operating in the Oil & Gas industry. The goal of this company might be to find suitable entities for a merger, acquisition or investment to achieve expansion. In this example, early warning signals can be engineered that would act as predictors that a certain company may achieve a status that would make that company a desirable acquisition target. The early warning signals that would be defined for this purpose can be generated by users based on their knowledge of prior acquisitions in the Oil & Gas industry, and by studying the events that led to those prior acquisitions that may have indicated that a certain company would have been a desirable acquisition target. After determining which of these events are reliable enough to suggest, on a reasonably consistent basis, that a certain company will become a desirable acquisition target, these events can be stored in a database and tracked over a future period of time. When these events occur sometime in the future, a user can then be alerted to the fact that a certain company will ultimately become a desirable acquisition target, based on the occurrence of the events defined by the early warning signals.

Although, we have described steps in the methodology of generating early warning signals with respect to the above example relating to Merger & Acquisition (M&A) applications in the Oil & Gas industry, the methodology can be adapted for use with respect to other applications and other industries.

Referring to FIG. 1, a flowchart illustrating the steps of an embodiment of a method of defining early warning signals is shown generally as 20, and the method commences at step 22. This method describes a methodology that can be used to generate flags referred to as early warning signals for any application of interest.

At step 24, a specific strategic goal or outcome is identified. The strategic goal specified at this step may be broadly or narrowly defined. In fact, the strategic goal to which early warning signals will relate can be any goal or outcome as defined by a user. In business applications, the strategic goal is usually defined in relation to a specific industry (e.g. mining, oil & gas, etc.), although the definition of the strategic goal need not be limited in this manner. Here are some examples of strategic goals that may be specified for various applications, and which may be applied to a variety of industries:

(i) in M&A applications, identifying suitable candidates for merger and acquisition;

(ii) in competitor analysis applications, anticipating competitor's actions;

(iii) in marketing applications, identifying when customers will be in need of certain services and who these customers are; and (iv) in risk management applications, identify areas of risk or problems of interest before they manifest such that counteraction may be taken.

At step 26, a basic scenario associated with the specific strategic goal identified at step 24 is identified. A "basic scenario" is a general characterization of a situation or opportunity that will allow a user company or organization to meet the specific strategic goal, and which the user would typically like to identify in a timely manner. Here are some examples of basic scenarios that may be specified relating to various applications, and which may be applied to various specified industries:

(i) in M&A applications, a desirable acquisition, partnership, or joint-venture;

(ii) in competitor analysis applications, an opportunity to enter a new market before a competitor;

(iii) in marketing applications, a customer who is purchasing the kind of services that the user is trying to market;

(iv) in risk management applications, a government liberalizing the investment climate in its country;

At step 28, one or more examples of past occurrences of the basic scenario identified at step 26 are identified. In other words, actual historical examples of occurrences of the basic scenario are identified by the users who are defining early warning signals. These occurrences typically represent past opportunities that the user company or organization would have liked to have acted on, or past opportunities that the company has acted on and considers desirable, and which are similar to the kinds of opportunities that it is looking for now and in the future.

For example, in M&A applications where the strategic goal is to identify suitable candidates for merger & acquisition, actual past deals that the user company or organization would have liked to have done, or did actually complete, are identified at this step.

At step 30, information pertaining to each example of a past occurrence of the basic scenario identified at step 28 is analyzed for "clues". Clues are generally states that have come to pass or events that have occurred in some specified period prior to each past occurrence, that might have suggested that the specific past occurrence was going to occur. For example, these clues may be generated by answering the following questions:

(i) What could we have known a year or two in advance (or some other specified period) that would have let us know that the specific occurrence (e.g. a specific deal, in M&A applications) was going to unfold?

(ii) What previous events or situations can we now see served as clues that we might have recognized which would have suggested that the specific occurrence was about to occur?

For example, in M&A applications, these clues may turn out to be as obscure as a company transferring a division office, a change in middle-level management, or a failure to display at an industry conference. However, the nature of the clues may differ significantly depending on the basic scenario, the specific strategic goal, and the relevant application and industry of interest.

To illustrate how these questions may be answered with respect to a particular application, the following example is provided. Suppose the strategic goal is to identify suitable candidates for merger and acquisition. Answering the above questions might involve developing a list of representative deals over a long period of time (e.g. 10 to 15 years). It is advantageous to work with an extensive time frame to ensure that both deals that are consistently proceeded by a series of typical events and deals that have resulted from an a typical series of events are represented, as well as successfully concluded deals and unsuccessful deals. Such a time frame should also account for any business and commodity cycles that may affect the conclusion of these various types of deals. A detailed profile of each deal being represented can then be created, identifying the players (e.g., parties to the deal), country and geographical region, the applicable business environment and world environment in existence at the time of the deal, the structure of the deal, and any other factors that would contribute to a detailed understanding of the deal. Subsequently, an exhaustive process of looking at these factors in hindsight (a process that can be referred to as "back-casting") is performed to identify those events that occurred and/or states that have come to pass over the time leading up to the deal itself, which when looked at individually or collectively, would have told someone (had they been able to recognize those events or states and make a connection between those events or states and the deal, at the time) that the deal would or would not likely have been ultimately concluded. It may be important that certain set of clues be considered collectively, as some clues taken by themselves may not be sufficient or even particularly suggestive to indicate that some specific occurrence was going to occur.

This profiling and back-casting process may be adapted for use in other applications (e.g. Product Development, Marketing, etc.) and basic scenarios relating to any industry of interest.

At step 32, the events or states identified at step 30 (i.e. the clues) are further analyzed to determine which events or states are reliable indicators that the basic scenario will occur. More specifically, the following question may be asked: If the events or states being analyzed were to occur today or sometime in the future, which of these are reasonably likely to suggest, either individually or in some combination, that the basic scenario will (or conversely, will not) subsequently come to pass? Reliable indicators are those events or states that can be used, on a reasonably consistent basis, either individually or in combination, to predict the occurrence of some future state or event defined by the basic scenario. In contrast, some of the events or states being analyzed may be characterized as anomalous indicators, which may be states or events that only play a role within a very specific environment or business condition.

At step 34, the reliable indicators are selected and defined as early warning signals. The early warning signals are associated with conditions (i.e. a state or event). A condition is satisfied if the underlying state has come to pass or the underlying event has occurred, whichever is applicable. As explained above, these early warning signals can be subsequently used to predict the occurrence of some future state or event defined by the basic scenario.

At step 36, the early warning signals defined at step 34 are stored in a storage medium. Preferably, the early warning signals are associated with a particular "context object" (e.g. in M&A applications, a specific project or company that may be a target for acquisition) when stored in a storage medium. Context objects are defined in an intelligence system that uses flags, as will be explained in further detail below. The storage medium may comprise one or more databases, for example, which is designed to allow the text of the descriptors to be searched by a search engine. A flag status indicator may be associated with each early warning signal and the values of flag status indicators may also be stored in the storage medium. Flag status indicators associated with early warning signals may also be searched by a search engine, allowing for example, a user to identify all early warning signals that have a "flagged" status associated with it.

Step 38 marks the end of a method of defining early warning signals. The steps of the method may be repeated for different basic scenarios, and for different strategic goals, if desired.

Similarly, another category of flags that may be engineered in accordance with the present invention can be referred to as "value indicators". A value indicator is a descriptor of a specific state associated with at least one strength of a user company or organization. A user company or organization may have various technical, financial, organizational, or other strengths that allow it to provide itself with a competitive advantage in achieving specific strategic goals under certain scenarios. For instance the value indicators can be used to find acquisition targets (e.g. an asset, a company) that have weaknesses corresponding to the defined strengths underlying the value indicators. Where a user organization with strong operating capabilities may be able to add value to a company that had weak operating capabilities, the user organization may wish to identify such companies as targets for acquisition. By identifying and defining states that indicate that the desirability of a company as an acquisition (from the perspective that the acquiring user organization can add value to the company based on the user organization's strengths), desirable acquisition targets can be identified at an early stage. Value indicators can be used in any situation where a user is looking to engage in a relationship with another entity, such as an acquisition, a sale, a joint venture, a partnership, an alliance, and targeted customer development, for example.

Figure 2:
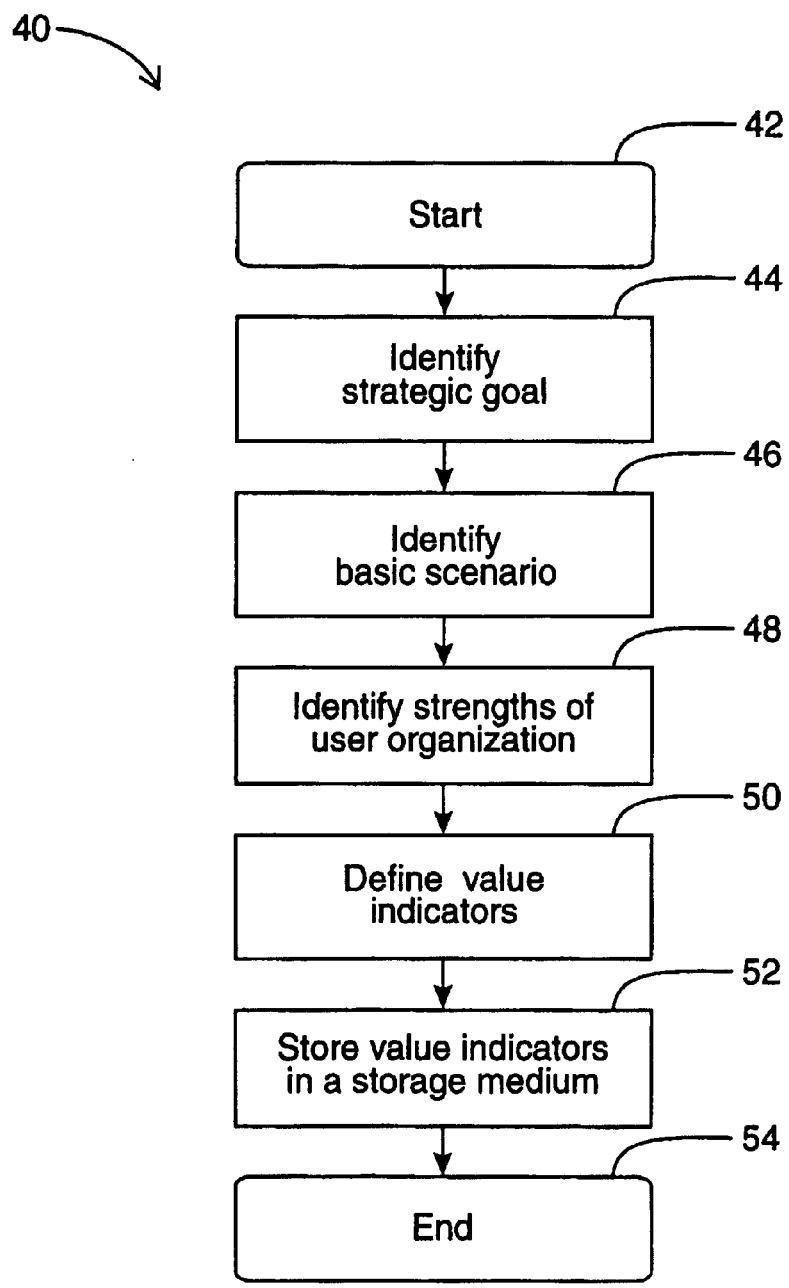
FIG. 2 is a flowchart illustrating the steps of an embodiment of a method of defining value indicators.

Referring to FIG. 2, a flowchart illustrating the steps of an embodiment of a method of defining value indicators is shown generally as 40, and the method commences at step 42. This method describes a methodology that can be used to generate flags referred to as value indicators for any application of interest.

At step 44, a specific strategic goal or outcome is identified. The strategic goal specified at this step may be broadly or narrowly defined. In fact, the strategic goal for which value indicators are to relate can be any goal as defined by a user. In business applications, the strategic goal typically relates to a specific industry (e.g. mining, oil & gas, etc.), although the definition of the strategic goal need not be limited in this manner. In defining value indicators, strategic goals are defined in terms of the outcome of a relationship with another entity (e.g. acquisition, sale, joint venture, partnership, alliance, targeted customer development), which the user is looking to engage in.

At step 46, a basic scenario associated with the specific strategic goal identified at step 44 is identified. A "basic scenario" is a general characterization of a situation or opportunity that will allow a user company or organization to meet the specific strategic goal, and which the user would like to identify in a timely manner. In M&A applications, the basic scenario is generally an opportunity for a desirable acquisition, partnership, or joint-venture in which the user company or organization can add value to the acquired target entity (e.g. asset, company) based on its own strengths.

At step 48, one or more strengths of a user organization are identified, where the strengths provide the user organization with a competitive advantage in achieving the strategic goal identified at step 44 under the basic scenario identified at step 46.

At step 50, value indicators are defined based on the strengths identified at step 48. Each value indicator is a descriptor of a specific state associated with at least one of the identified strengths. A value indicator typically describes a condition that may be satisfied when the state of a potential target entity reflects a weakness in the target entity corresponding to the identified strength on which the value indicator is based. The value indicator is generally a short term (e.g. 5–6 words or less) that describes the essence of the weakness to be detected in a potential target entity. Value indicators can then be displayed to users of an intelligence system, in which a user can determine from the descriptor whether the underlying state exists in a particular entity. An example of such an intelligence system will be described in further detail later in this specification.

At step 52, the value indicators defined at step 50 are stored in a storage medium. Preferably, the value indicators are associated with a particular "context object" (e.g. in M&A applications, a specific project or company that may be a target for acquisition) when stored in a storage medium. Context objects are defined in an intelligence system which uses flags, as will be explained in further detail below. The storage medium may comprise one or more databases, for example, which are designed to allow the text of the descriptors to be searched by a search engine. A flag status indicator may be associated with each value indicator and flag status indicators (and their values) may also be stored in the storage medium. Flag status indicators associated with value indicators may also be searched by a search engine, allowing for example, a user to identify all value indicators that have a "flagged" status associated with it.

Step 54 marks the end of a method of defining value indicators. The steps of the method may be repeated for different basic scenarios, and for different strategic goals, if desired.

A wide range of other categories of flags may also be defined, and flag status indicators can be associated with these flags. For any endeavor where there is a need or desire to monitor or track a state of being, a state of activity, a state of fit, or a state of development in a particular direction relating to any object or entity, whether in the present or as a predictor of a future state, a set of flags can be defined. Each flag can then be assigned, for example, a "flagged" status or an "unflagged" status through the use of flag status indicators associated with the flags, to indicate the presence or absence of the state being monitored or tracked. Flags can be used to monitor and track the occurrence of events or actions, or more generally the satisfaction of any specified condition. For example, flags relating to competitor activity (e.g. whether other companies are targeting a certain asset), flags relating to the status of a current deal being negotiated or some current activity being monitored (e.g. whether certain discussions are in difficulty, or whether a company is looking for financing) or flags relating to market or economic indicators (e.g. whether certain market conditions have become present that indicate that a company may encounter financial difficulties) can be defined. Generally, flags are indicators of pre-specified states, events, actions or circumstances that a user wishes to track, and which a user may wish to respond to in a timely manner.

Figure 3:
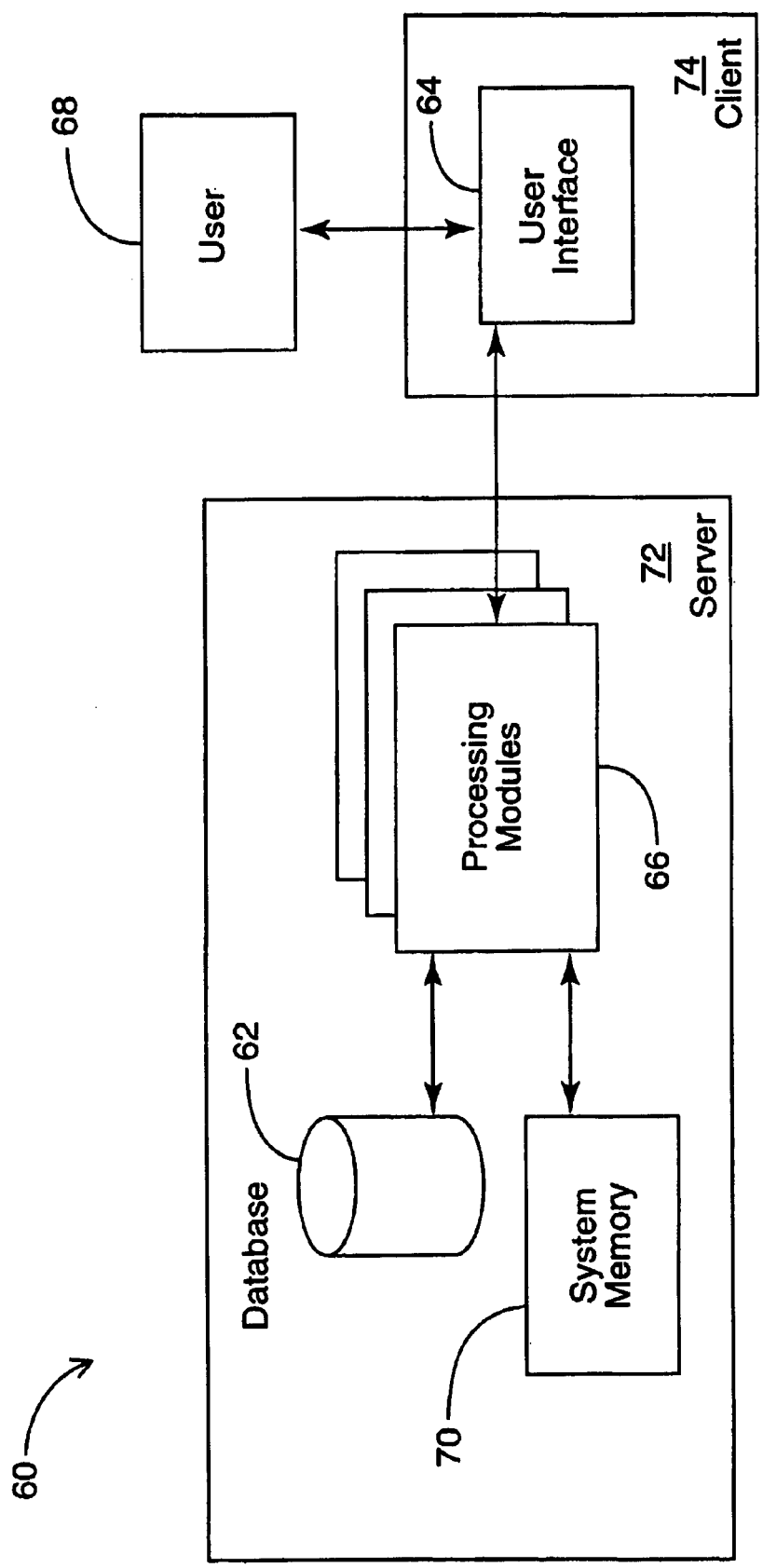
FIG. 3 is a schematic diagram of components of an embodiment of a system for generating flags.

FIG. 3 is a schematic diagram of components of an embodiment of a system for generating flags, the system shown generally as 60. In this embodiment of the present invention, system 60 comprises a database 62, a user interface 64, and one or more processing modules 66.

Database 62 is a storage medium used to store flags generated (i.e. engineered) in accordance with the present invention, and can be accessed by processing modules 66. Processing modules 66 are programmed to implement one or more of the methods of generating flags in accordance with the present invention, using information received from a user 68 through user interface 64. In variant embodiments of the invention, the contents of database 62 may be distributed across multiple storage devices (including memories, databases, and/or other storage media for example), and instructions performed by processing modules 66 may be stored on a computer-readable medium. Processing modules 66 may also be connected to a system memory 70 for temporary storage of data used in calculations or other tasks performed in the process of generating flags.

Database 62, processing modules 66, and system memory 70 may reside on a server 72, while user interface 64 may reside on a client computing device 74, although other configurations of the system 60 are possible. As one skilled in the art will recognize, any of the components of system 60 may be distributed across multiple computing servers or systems as chosen by an implementer of the present invention for performance, security, robustness, or other reasons.

In a preferred embodiment of the invention, the flags generated or engineered in accordance with the present invention are used in an intelligence system. The intelligence system collects data of various types, in various forms, and from various sources, for storage in one or more system databases. The intelligence system is configured to present data that it collects to certain users for analysis. These users can analyze the data to determine whether the values of flag status indicators assigned to predefined flags stored in a system database of the intelligence system ought to be changed. The user can input additional data to be associated with selected predefined flags, whether the user changes the flag status indicators associated with them or not, which can also be stored in the system databases. In this embodiment of the present invention, a set of predefined flags that have previously been generated are used in the intelligence system. However, in other embodiments of the invention, the intelligence system itself may provide users or an implementer of the intelligence system with the facility to generate flags prior to use (e.g. adding new flags), either before the intelligence system is deployed for operation or during its operation.

Most preferably, flags are associated with "context objects". A context object is an object belonging to a predefined type or context object category to which data may be associated. A context object can essentially be any thing or action. For example, context object categories in an intelligence system directed to M&A applications may be assets, companies, and countries of interest. A context object in this case, would provide a basis for the grouping of information on a specific asset, company, or country. More generally, context objects may include, for example, assets, companies, countries, products, projects, future descriptive scenarios, or groups of one or more of these context objects. However, a variety of different context objects categories may be defined in an intelligence system depending on what application(s) the intelligence system is to be configured for. Context objects defined for use in an intelligence system need not belong to mutually exclusive types or context object categories, and users of the intelligence system may wish to associate data with more than one context object. A context object may also have context object attributes associated with it, which are distinguishing characteristics of the context object. For example, an identifier that is used to denote a classification of a particular asset (where the asset is a context object) can be considered a context object attribute. Context object attributes are also stored in the system database.

The present invention allows both "hard" data and "soft" data to be collected by the intelligence system, and managed together in a manner that facilitates decision-making by users of the system. Hard data consists of facts about a situation, or a context object. Typically, these facts are known (i.e. can be determined from public sources), measurable, and quantifiable. Hard data may be characterized as "backwards-looking" since it consists of facts that have been established sometime in the past. Some prior art intelligence systems already provide users with ways to access hard data, as its sources are generally widely available and accessible.

On the other hand, soft data relates to data that is not based on "fact", but represents something less concrete; soft data may relate to intentions, speculations, rumors, or gossip regarding facts, for example. Soft data may also relate to perceptions, thoughts, opinions, desires, or strategies, relating to facts, events, or context objects. In some cases, soft data might be characterized as "forward-looking", since a particular piece of soft data which might not be an established fact now may become an established fact in the future, if what underlies the data comes to pass. Since soft data is typically not quantifiable or concrete in nature, and since it is often difficult or impossible for a decision-maker to confirm the accuracy of this type of data or determine its relevancy, it is usually not tracked effectively, if at all, by prior art intelligence systems.

To some extent, some soft data that is within the direct knowledge of a decision-maker is typically used in the decision-making process (and used to interpret hard data made available to him or her). However, that decision-maker will usually not have access to soft data in the possession of other people not in direct contact with him or her, such as lower-level employees in a company. These other people may be in possession of or have knowledge of extremely valuable data, which may not be available from any other source and which could have a significant impact on the decision-making process, but which may not be made known to the decision-maker due to a lack of recognition of its importance at the source of the data, and a lack of formalized means of collecting this type of data from these other people and communicating the data to the decision-maker and others. In addition, that soft data may not reveal its implications for action until put into context with other data on the same context object.

An intelligence system configured and designed in accordance with the present invention allows both these types of data (i.e. soft data and hard data) to be collected and placed into a context that allows users of the intelligence system to better assess the significance of the data. It allows soft data and hard data to be examined collectively as it relates to specific context objects, and can be used to determine if a specific status should be associated with the flag status indicator of a selected flag. For example, this can be particularly advantageous if the selected flag is an early warning signal, since soft data may be relevant in predicting that a condition will occur before it occurs, while the data is still only a rumor or speculation and before it has become public knowledge.

As indicated above, the data collected by the intelligence system can be of various types, in various forms, and from various sources. Certain data items collected by the intelligence system (including hard and soft types of data, for example) can be characterized as Primary Source data. Primary Source data is sometimes referred to as "Human Intelligence". Primary Source data is data that is input directly from a human source intended to be communicated to another human. In other words, Primary Source data consists of "person-to-person" communications. Primary Source data may be, for example, the contents of an electronic mail message, the contents of a letter, the details of a conversation, or the details of a radio transmission from one person to another. Given the nature of soft data, most soft data will originate from a human source, and in that case, the soft date can also be further characterized as Primary Source data. These human sources may be for example, employees of a user company that has implemented the intelligence system.

Primary Source data may relate to technical information, rumors, gossip, public announcements, news data, commentary, or other user-entered data, for example. Typically, Primary Source data comprise data items that users may have come across in their day-to day business dealings, but which may not yet be public information. The intelligence system facilitates the gathering, categorizing, putting in context, and analysis of Primary Source data. The intelligence system provides means for allowing users to input this type of data through a user interface (e.g. connected to the World Wide Web), and categorizes and puts the data into context by allowing the user to associate each data item he inputs into the intelligence system with a specific predefined flag or context object. Furthermore, Primary Source data (and Secondary Source data, described below, which has been associated with specific predefined flags), once input, will then generally be made available to other users of the intelligence system, with the originator of the input data clearly identified. Other users may then assess the relevance or accuracy of the data entered by the user, and may do so with regard to other data stored in the intelligence system (e.g. hard data stored in a system database). In this manner, the present invention essentially provides a "feedback" loop that allows user-entered data to be scrutinized by other users of the intelligence system. Users (e.g. employees) that contribute information can then be recognized for the information they provide. This may help to improve morale and enthusiasm for using the system as it allows users to be recognized by their peers and superiors for the contributions they provide. In this way, it deals with the ubiquitous problem of many prior art Competitive Intelligence, Business Intelligence, or Knowledge Management Systems in which it can be difficult to sustain ongoing usage of those systems.

The intelligence system may also permit users to input this type of data using electronic mail, where a user may submit to the intelligence system an electronic mail message with data to be input. The intelligence system can subsequently filter out data from the electronic mail message for storage in a system database. Instructions on how the data should be categorized, and what flags or context objects the data should be associated with or linked to, may also be contained in the electronic mail message.

When setting a specific predefined flag to a "flagged" status to indicate that an underlying state has come to pass or an underlying event has occurred, a user of the intelligence system can enter a text comment to be associated with the specific predefined flag describing his justification for assigning that flag the "flagged" status. The comment can be characterized as Primary Source data. In a preferred embodiment of the invention, any such comments input to the intelligence system must always be associated with a predefined flag, so that such data can be placed into context for subsequent analysis. However, in variant embodiments of the invention, a predefined flag can be "flagged" by a user without having to input comments or to associate comments with it, and comments can be associated with a predefined flag without having it "flagged".

Data that can be characterized as Secondary Source data is also collected by the intelligence system. Secondary Source data is retrieved from some source of published data, which can be retrieved automatically from a data source such as a database, a data stream, or the results of a search engine, for example. Typically, Secondary Source data comprises data items obtained from "traditional" sources that are generally publicly available, and may include press release data, news data, data stored in databases, data retrieved from web searches, research data, data retrieved from a data stream, or results of a search engine, for example. The intelligence system also facilitates the gathering, categorizing, putting in context, and analysis of Secondary Source data. The intelligence system provides means for receiving this type of data through a data source interface (such as a news feed, which may be accessible through the Internet, for example), and categorizes and puts the data in context by allowing each data item to be associated with a specific predefined flag or context object by users.

Given the nature of hard data, most hard data will originate from some source of published data (e.g. a database), and in that case, the hard data can also be further characterized as Secondary Source data. However, hard data may also be obtained from a human source (e.g. entered by a user), in which case the data obtained in that manner would instead be characterized as Primary Source data.

For example, an intelligence system can receive the text of news articles or press releases from an external news source (e.g. Reuters®). This news data can be characterized as Secondary Source data. This news data can be displayed to a user of the intelligence system who can analyze the news data, and subsequently associate or "link" news articles that are relevant to a particular context object or predefined flag to that context object or predefined flag respectively.

Similarly, other documents, files, web links, electronic mail messages, or other data objects may be associated or "linked" to a specified context object or predefined flag.

An intelligence system designed in accordance with the present invention also provides for a means (e.g. a search engine) for searching Primary Source and Secondary Source data, as well as flags and context object attributes. This provides a user of the intelligence system with a sophisticated way of looking at data relating to any number of context objects, with their associated Primary Source data, Secondary Source data, and flags, together in a variety of combinations. The search parameters are limited only by the context object attributes available for searching, the number of flags associated with each context object, and the number of related context objects.

Figure 4:
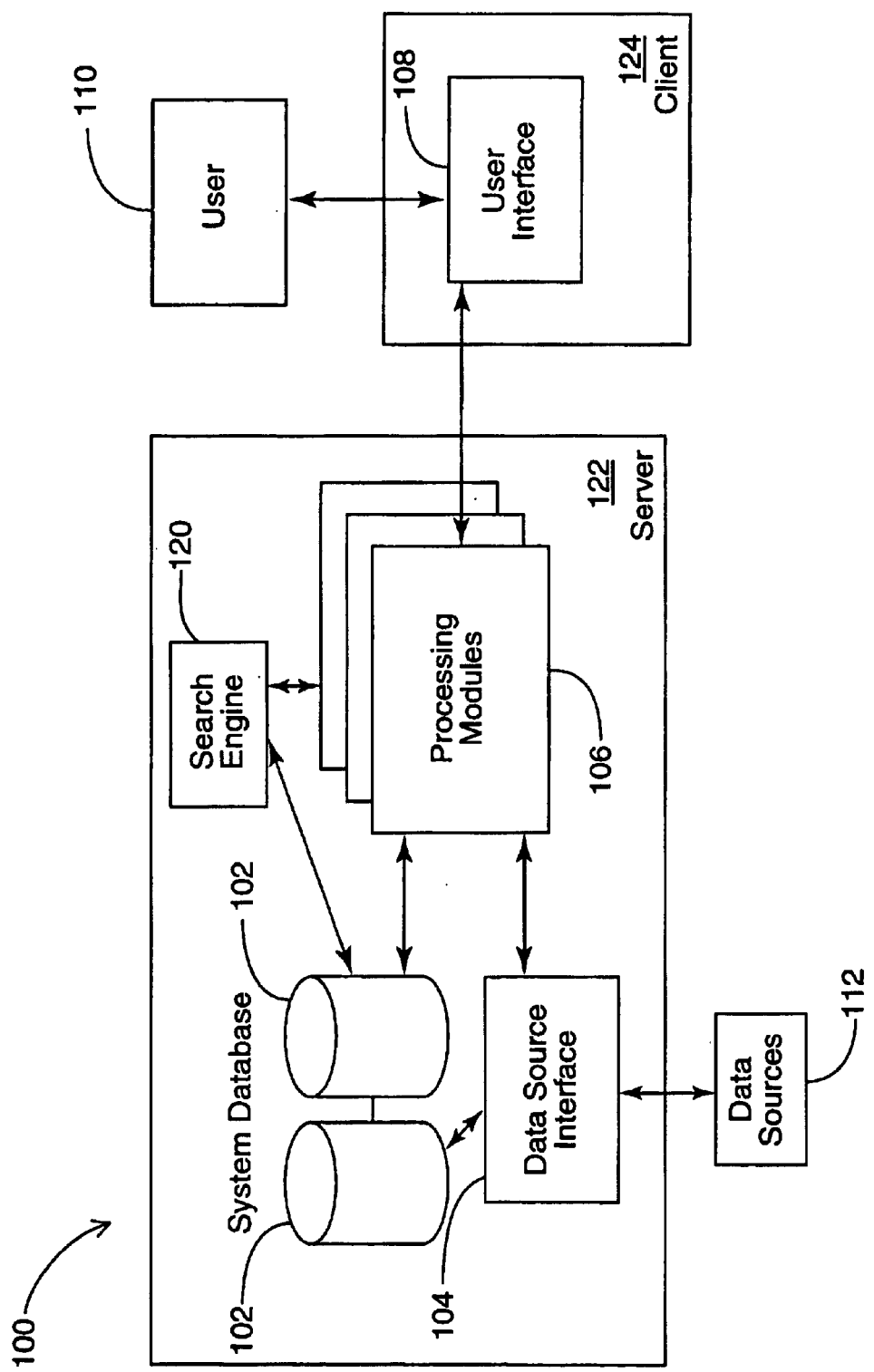
FIG. 4 is a schematic diagram illustrating an embodiment of an intelligence system.

Referring to FIG. 4, a schematic diagram illustrating an embodiment of an intelligence system is provided, the intelligence system shown generally as 100. System 100 comprises means for collecting and analyzing intelligence data relating to one or more predefined context objects, each context object having a set of context object attributes associated with the context object. System 100 comprises one or more system databases 102, a data source interface 104, one or more processing modules 106, and a user interface 108.

In this embodiment of the invention, system databases 102 are used to store data collected by system 100. This includes hard and soft data, which may be further characterized as Primary Source data and/or Secondary Source data. Types of data items that may be characterized as Primary Source or Secondary Source data were described earlier in this specification. Primary Source data is collected from users 110 of system 100 as input, through user interface 108. Secondary Source data is collected from one or more data sources 112 that are typically external to the server 122 on which system databases 102 and processing modules 106 reside. Data sources 112 may be accessed by system 100 through a network connection to the Internet, an Intranet, or through some other data communications link coupled to system 100, for example. However, a data source 112 may also be a local storage medium, such as a database coupled to system 100 through data source interface 104. Data sources 112 may include, for example, sources of news or other information.

In a preferred embodiment of the invention, system databases 102 are also used to store a set of predefined flags, where each predefined flag is associated with at least one predefined context object, and where each predefined flag is a descriptor that has a specific condition (i.e. a state or event) associated with it. Flags are pre-engineered indicators that have been defined for use in a specific implementation of system 100, depending on the area of application in which system 100 is to be used. Flags may comprise early warning signals, value indicators, or other types categories of flags as may be predefined. Properties of flags are described earlier in this specification. Values of flag status indicators associated with flags are also stored in system databases 102. Flag status indicators may be represented using Boolean variables, if a flag status indicator can only be assigned one of two values (e.g. flagged or unflagged).

System databases 102 are also used to store context object attributes associated with predefined context objects defined in system 100. When a system 100 is being configured or designed for use in relation to a specific application, the appropriate context objects are created, the appropriate Secondary Sources of data are determined, and the appropriate flags are engineered. This allows system 100 to be customized for different applications in different implementations.

System databases 102 may also comprise other documents, files, web links, electronic mail messages, or other data objects, which can be associated or "linked" to a specific predefined context object or predefined flag. Security protocols that permit only certain users to access certain documents or any other data items or data objects associated or linked to a specific predefined context object or predefined flag may also be implemented in system 100.

System 100 also comprises a search engine 120 controlled by processing modules 106 and connected to system databases 102. Search engine 120 can be powered by commercially available search engine technologies or by a search engine designed specifically for system 100, for example. Search engine 120 is programmed to search at least a subset of searchable data stored in system databases 102 that satisfy certain search criteria received as input from users 110 through user interface 108. Searchable data will typically comprise the context object attributes, flags and flag status indicators associated with those flags, Primary Source data, and Secondary Source data stored in system databases 102 as described above. Search criteria for searches that are to be repeated may be saved in memory, system databases 102, or other storage device(s) for subsequent use.

Processing modules 106 of system 100 are connected to system databases 102, user interface 108, and search engine 120. Processing modules 106 are programmed to perform a variety of functions to facilitate the collection, search, and analysis of data received by and stored in system 100. For example, processing modules 106 can be programmed to perform the following tasks:

(i) display any number of predefined flags to one or more users 110 through user interface 108 and permit them to change the value of user-specified flag status indicators (e.g. to a flagged or unflagged status) associated with one or more specified predefined flags;

(ii) receive Primary Source data, such as comments, from one or more users 110 as input to be stored in system databases 102, and to associate the comments with one or more specified predefined flags if desired; and (iii) receive search criteria from one or more users 110 (who may be different from the users who changed the values of flag status indicators in (i) or who input Primary Source data in (ii)) to be used by search engine 120, and to report search results generated by search engine 120 to users 110 for subsequent analysis.

In some applications, processing modules 106 may also be programmed to track the status of one or more sets of selected context objects, by allowing a user to view data associated with selected context objects collectively in sets or lists, in some desired manner. Each set may be considered to be a "target portfolio" or a "saved list" of context objects. For example, processing modules 106 can be programmed to generate reports for a saved list, search for new information associated with context objects in a saved list, or perform other tasks based on the data associated with context objects in a saved list.

Other tasks that involve the collection, search, analysis, reporting, or any other manipulation of data received by components of system 100 may be performed by processing modules 106, as programmed by an implementer of system 100.

In this embodiment of the present invention, system database 102, data source interface 104, and processing modules 106 reside on an application server 122, although in variant embodiments of the present invention, one or more of these components or parts of these components may reside on different servers or system as chosen by an implementer of the present invention for performances, security, robustness, or other reasons User interface 108 typically resides on a client computing device 124, through which data may be provided as output to users 110, and through which data may be received from users 110 as input to system 100. User interface 108 may be a web browser or some other custom user interface, for example. Where the user interface 108 is a web browser, data may be displayed to users 110 using Hypertext Markup Language (HTML) pages or Java Server Pages (JSPs), for example. User interface 108 may reside on a terminal, client, server, other computing device, cell phone, personal digital assistant (PDA), or other electronic device. User interface 108 may be connected directly to application server 122, or indirectly to application server 122 through an Intranet connection, using a dial-up server, using a gateway/proxy server, through an Internet connection, or any other connection as is known, or any combination of these.

System 100 may also be coupled to a file system [not shown], which can be connected to application server 122 or which may reside on application server 122, for example. The file system can be used to store documents that can be associated with various context objects. The filed documents can be linked to the predefined context objects with which they are associated.

Figure 5:
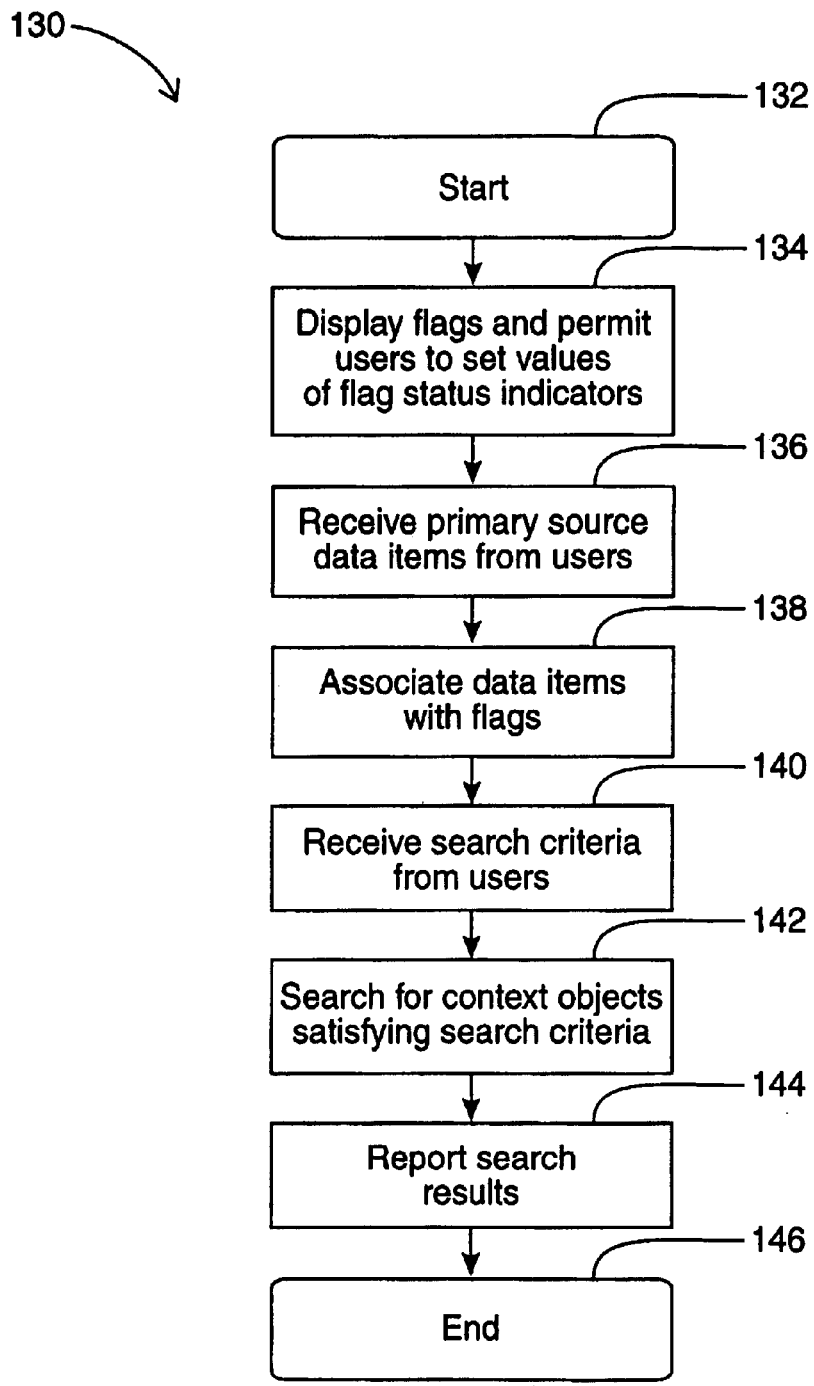
FIG. 5 is a flowchart illustrating the steps of an embodiment of a method of collecting and analyzing intelligence data.

Referring to FIG. 5, a flowchart illustrating the steps of an embodiment of a method of collecting and analyzing intelligence data is shown generally as 130, and the method commences at step 132.

At step 134, one or more predefined flags can be displayed to one or more first users. These first users are users of system 100 (FIG. 4) that wish to view a number of pre-defined flags to determine if the underlying condition has been satisfied (i.e. to determine if an underlying state has come to pass or an underlying event has occurred). The nature of these predefined flags were explained in greater detail with reference to previous Figures in this specification. At this step, the first users are also permitted to set the value of a user-specified flag status indicator (e.g. to reflect a flagged status or an unflagged status) associated with one or more of the predefined flags displayed and viewed by the first users.

At step 136, data items that can be characterized as Primary Source data and that have been entered as input are received from one or more second users. These second users are users of system 100 that wish to provide data relating to a predefined context object or predefined flag to the system 100. The data that they input is then typically made available to other users of system 100. For example, a second user may wish to input rumors or gossip pertaining to some specified context object for other users of the system 100 to consider. A second user who enters Primary Source data at this step may also be (but not necessarily) a first user who views flags and assigns conditions to them at step 134.

At step 138, one or more data items received at step 136 can be associated with at least one of the predefined flags, as directed by a second user.

At step 140, search criteria are received from one or more third users. These third users are users of system 100 that wish to search the data received as input by system 100 to perform a strategic analysis, and to identify opportunities that may lead to the satisfaction of a certain strategic goal for which system 100 may be used, for example. A third user may or may not be a first or second user as defined with reference to steps 134 or 136. For example, it may be the case that system 100 is configured by an implementer of the present invention to permit one set of users to input intelligence data into system 100 (which is subsequently collected and categorized), and to restrict the ability to search collected data and the accessibility of search results to a different set of users. In fact, in variant embodiments of system 100, various means of controlling which tasks or operations can be performed by particular users can be employed in known manner.

At step 142, a search of searchable data is performed for context objects satisfying the search criteria received at step 140. In this embodiment of the invention, the search is performed using a search engine. As indicated above with reference to FIG. 4, searchable data will typically comprise the context object attributes, flags and flag status indicators assigned to those flags, Primary Source data, and Secondary Source data stored in system databases.

At step 144, the results of the search performed at step 142 are reported to one or more third users. These search results may be reported in a variety of manners, through the use of customized reports that can be generated as output, for example.

Step 146 marks the end of a method of collecting and analyzing intelligence data. The steps of the method need not be performed in any particular order, and any step or group of steps of the method may be repeated.

An intelligence system and method of collecting and analyzing intelligence data can be implemented for any of a large number of possible applications relating to any of a large number of industries, markets or organizations. For example, some possible functional applications to which the present invention may be directed include:

(i) Mergers & Acquisitions, (ii) Competitive Intelligence, (iii) Strategic Planning,
(iv) Finance,
(v) Marketing,
(vi) New Product Development,
(vii) Strategic Alliances and Partnerships,
(viii) Technology Licensing,
(ix) Human Resources,
(x) Investment/Venture Capital,
(xi) Risk Analysis,
(xii) Intention Assessment,
(xiii) War Gaming,
(xiv) Scenario Planning,
(xv) Urban Planning, and
(xvi) Education, Housing and Social Service Needs Planning.

The applicability of the present invention is not restricted to the above-mentioned areas, which serve only as examples.

Each of these example applications may encompass narrower applications which themselves can be applications to which an intelligence system configured in accordance with the present invention may be directed. By creating customized context objects, determining appropriate data sources of Secondary Source data, and engineering or generating appropriate flags, the present invention can be applied to many applications.

Furthermore, these applications may also relate to any of a number of markets or industries, including for example:
(i) Oil & Gas,
(ii) Mining,
(iii) High Technology (Hardware & Software),
(iv) Pharmaceuticals & Biotechnology,
(v) Financial Services (Banking, Personal Finance, Insurance, etc.),
(vi) Retail,
(vii) Construction,
(viii) Real Estate Development, and
(ix) Investment Funds.

The applicability of the present invention is not restricted to the above-mentioned areas, which serve only as examples.

To illustrate more clearly various aspects of the present invention, certain features of a new intelligence system designed in accordance with an embodiment of the present invention that applies specifically to mergers and acquisitions and competitor intelligence applications in the Oil & Gas industry, are now described in an example of how the present invention may be utilized.

Figure 6:
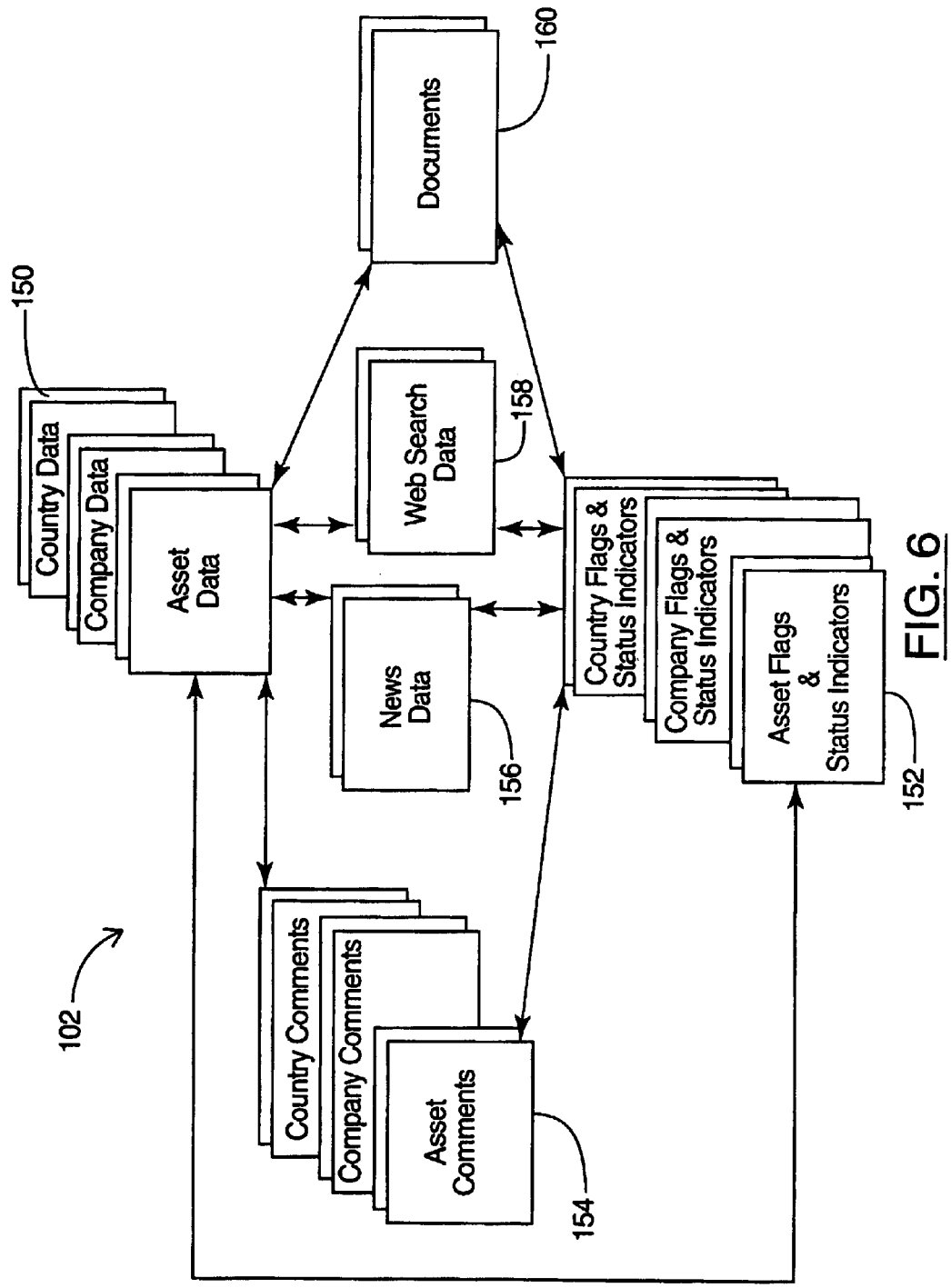
FIG. 6 is a schematic diagram of a database structure utilized in an example implementation of an intelligence system in an embodiment of the present invention.

Referring to FIG. 6, a schematic diagram of a system database structure utilized in an example implementation of an intelligence system of an embodiment of the present invention is provided. System databases 102 of an intelligence system 100 (FIG. 4) are comprised of tables, and may be used to store data such as context object attributes, flags and flag status indicators associated with those flags, Primary Source data, and Secondary Source data. In this example implementation, each predefined context objects of system 100 belongs to one of the following context object categories: assets, companies, or countries. The context object attributes are supplied from commercial industry databases (and augmented by users of system 100). Appropriate flags have been pre-engineered for each context object and have been predefined for use in system 100.

Context object data tables 150 are used to store data associated with instances of different context objects. In this example implementation, a context object may be an asset, a company, or a country of interest. The data stored in these context object data tables 150 may be generally characterized as context object attributes.

Context object data tables are linked to flag data tables 152. In this application, different flag data tables 152 are used to store data relating to flags associated with the different context objects. Flag data tables 152 store the predefined flags (i.e. descriptors) and the values of flag status indicators associated with the predefined flags.

Comments data tables 154 are linked to context object data tables 150 and flag data tables 152. In this application, different comments data tables 154 are used to store data associated with different context objects. Comments data tables 154 store data that typically is associated with specific predefined flags as specified by a user, although comments may also be associated with a context object. The data stored in these comments data tables 154 may be generally characterized as Primary Source data.

News data tables 156 and web search data tables 158 may also be linked to context object data tables 150 and flag data tables 152, for storing news information and web search results respectively, for example. The data stored in these tables may be generally characterized as Secondary Source data.

Documents data tables 160 may be used to store index information relating to documents that are linked to certain predefined context objects or predefined flags. The documents themselves may be stored in a separate storage medium such as a file server, for example.

In variant embodiments of the present invention and in different applications for which the present invention is implemented, an organization of data entities and data structures that differs from those shown in FIG. 6 may be used, and more or fewer data tables than those shown may be employed. For example, parallel data structures (e.g. tables) may be used to store data such that one copy of the data is stored on an application server while another copy of the data is stored on a client computing device, with means to synchronize the data in the parallel data structured being employed as known.

FIGS. 7 to 10C are examples of screens that may be generated as output in a user interface in the example implementation of an intelligence system of an embodiment of the present invention.

Figure 7:
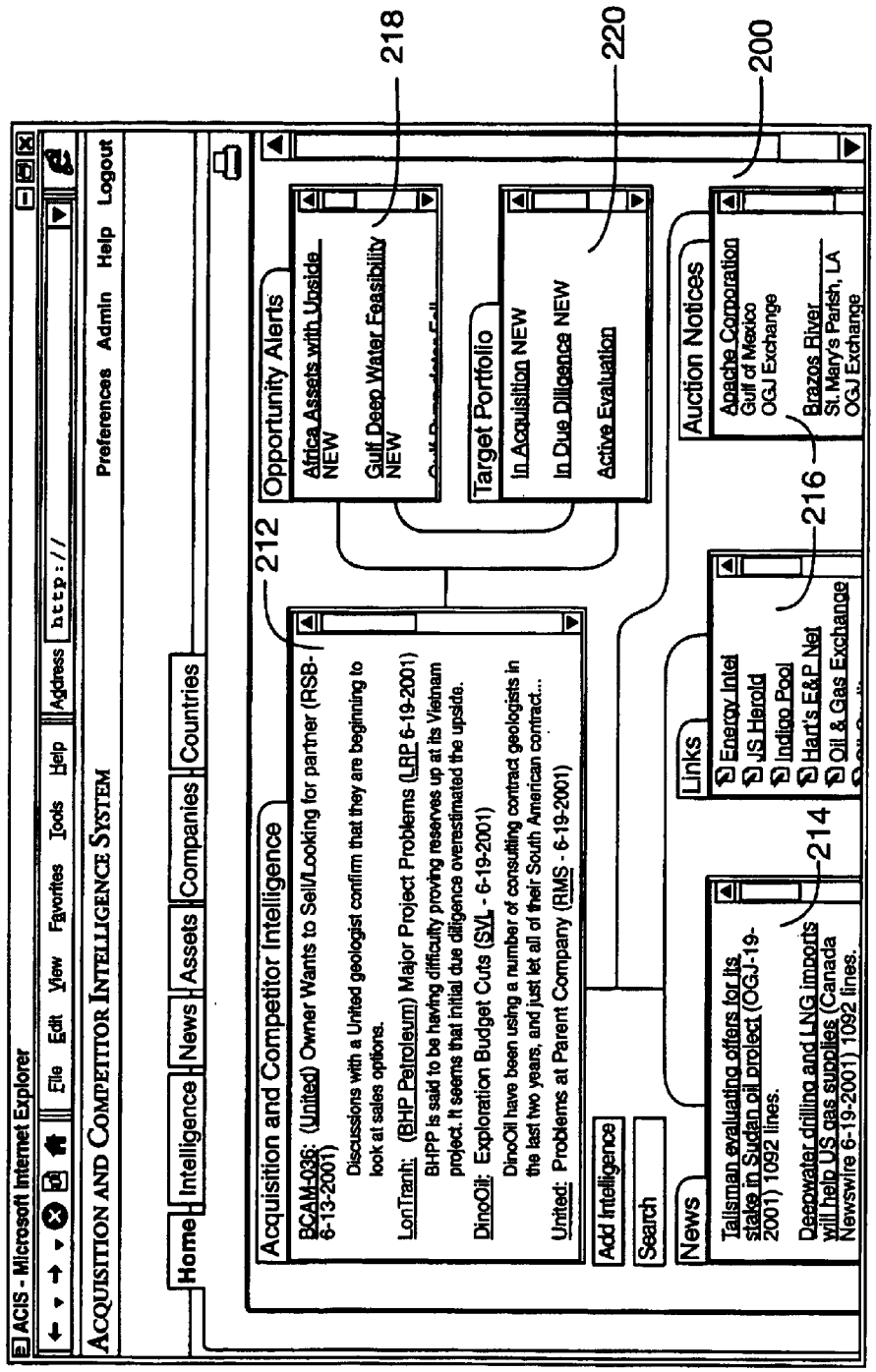
FIG. 7 is an example of a main page displayed to a user in an example implementation of an intelligence system in an embodiment of the present invention.

FIG. 7 illustrates the "home" page or main page shown generally as 200, which in a preferred embodiment is provided to the user via a World Wide Web (WWW) browser window of an intelligence system hereinafter referred to as ACIS. The data displayed on main page 200 summarizes data collected by ACIS for the user. Primary Source data is displayed in a format resembling headlines in a comments control 212. Secondary Source data such as news articles can be accessed by links displayed in news control 214. Other controls 216 to display other types of data, documents, or links thereto are also displayed on main page 200.

Opportunity alerts control 218 contains links to results of user-defined searches. For example, a user may define a search that searches periodically for context objects having a certain number or certain combination of specified flags that have been assigned a "flagged" status. When such context objects are found, a user can be alerted to this search result through a message in the opportunity alerts control 218. In ACIS, this can provide a way of alerting users in advance of potential acquisition opportunities for example, based on certain specified early warning signals and/or value indicators or other flags that have been detected or "flagged" by other users of ACIS.

Data relating one or more user-specified groups of context objects of interest may be accessible through links in the target portfolio control 220.

Figure 8:
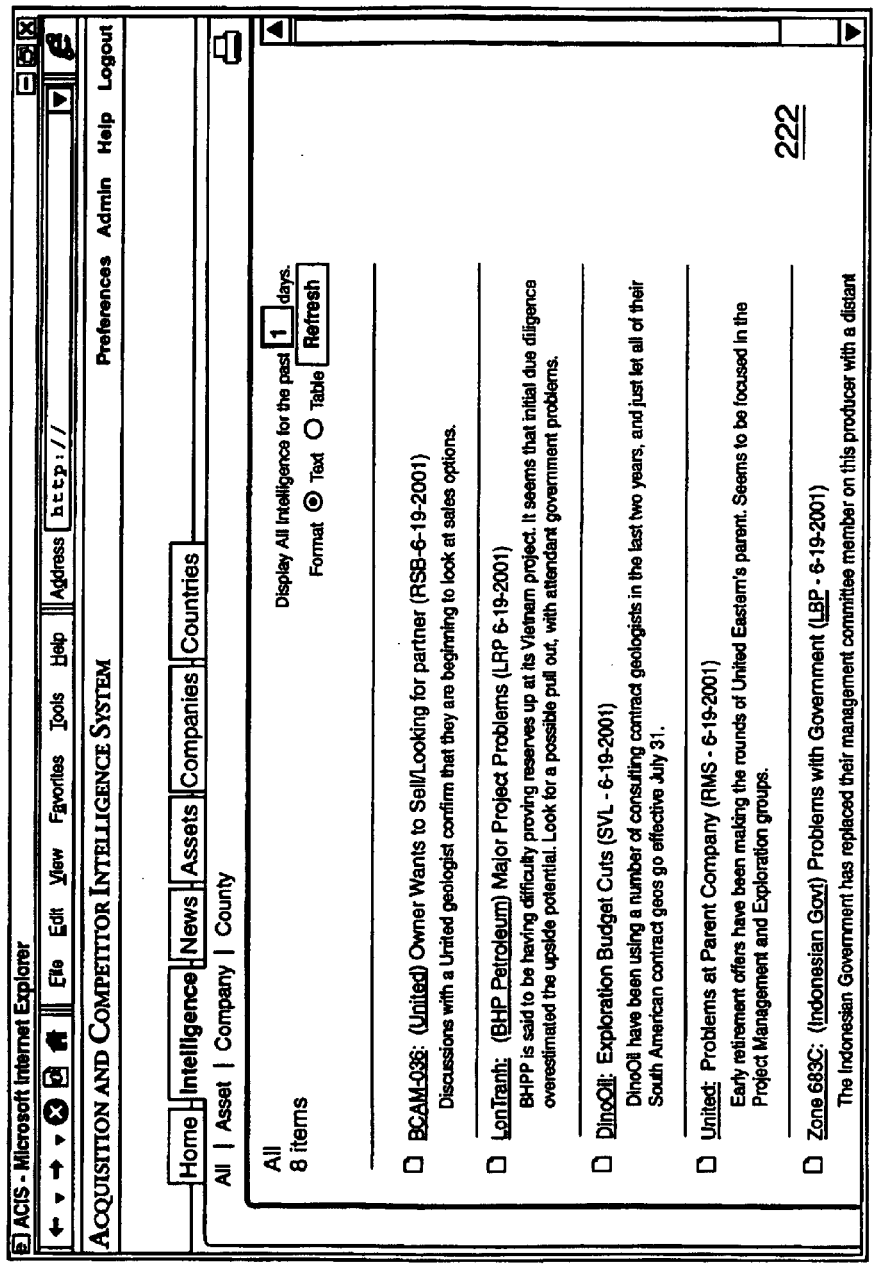
FIG. 8 is an example of an intelligence page displayed to a user in an example implementation of an intelligence system in an embodiment of the present invention.

FIG. 8 illustrates output of an intelligence page 222 displayed to a user in an example implementation of an intelligence system in an embodiment of the present invention, where comments entered by users are displayed for analysis. Comments can be marked as "read" by a user, if desired.

Figure 9:
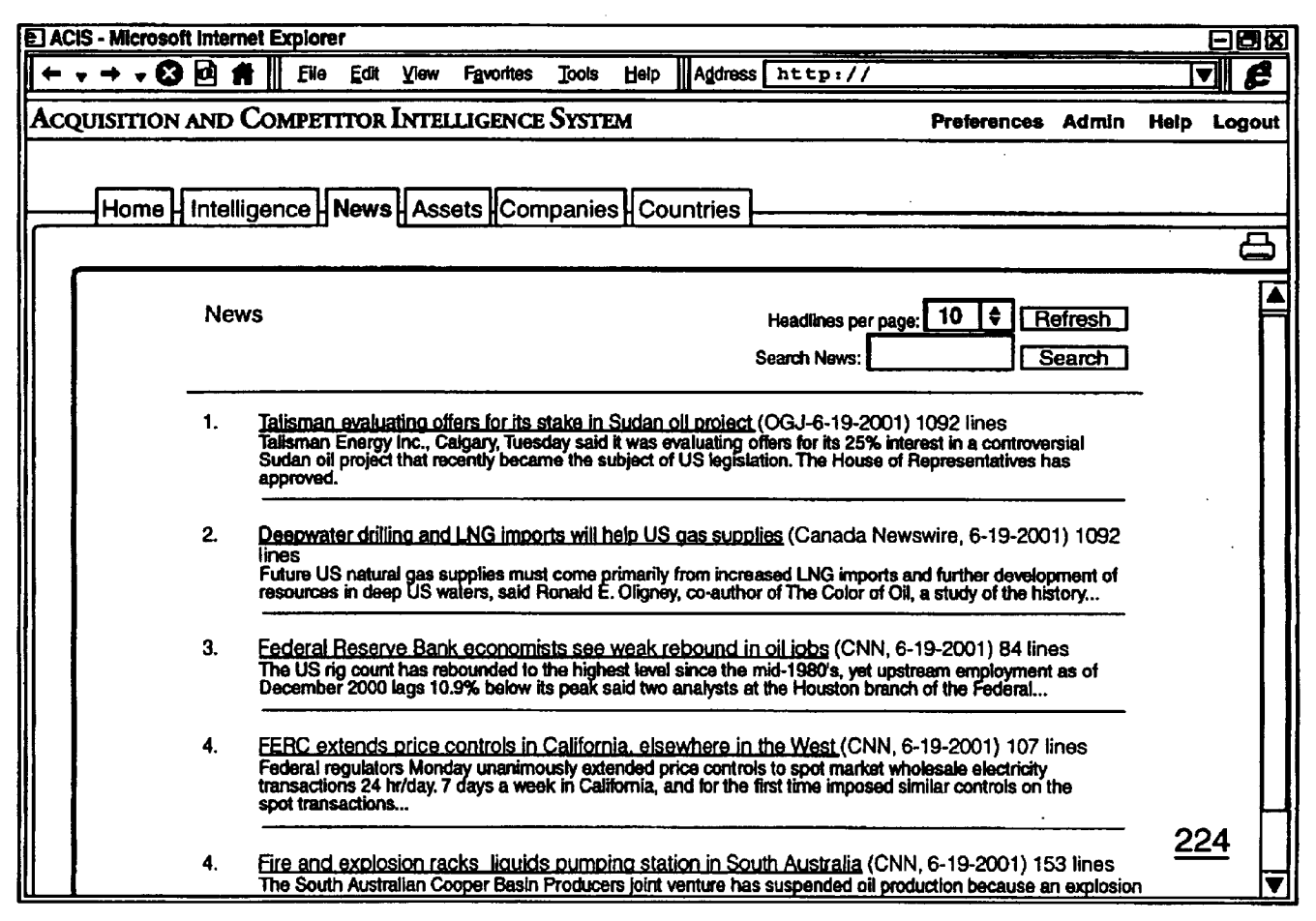

FIG. 9 illustrates output of a news page 224 displayed to a user in an example implementation of an intelligence system in an embodiment of the present invention, where news (e.g. articles or press releases) is provided, and where news headlines and summaries may be displayed to a user and then linked to appropriate context objects.

FIG. 10A illustrates a flag chart 228 of flags associated with assets that may be displayed to the user in an example implementation of an intelligence system in an embodiment of the present invention. Examples of early warning signals 230 and value indicators 232 in this example implementation are listed.

FIG. 10B illustrates a profile page 234 displayed to a user in an example implementation of an intelligence system in an embodiment of the present invention, where context object attributes for a specific asset are summarized.

Figure 10C:
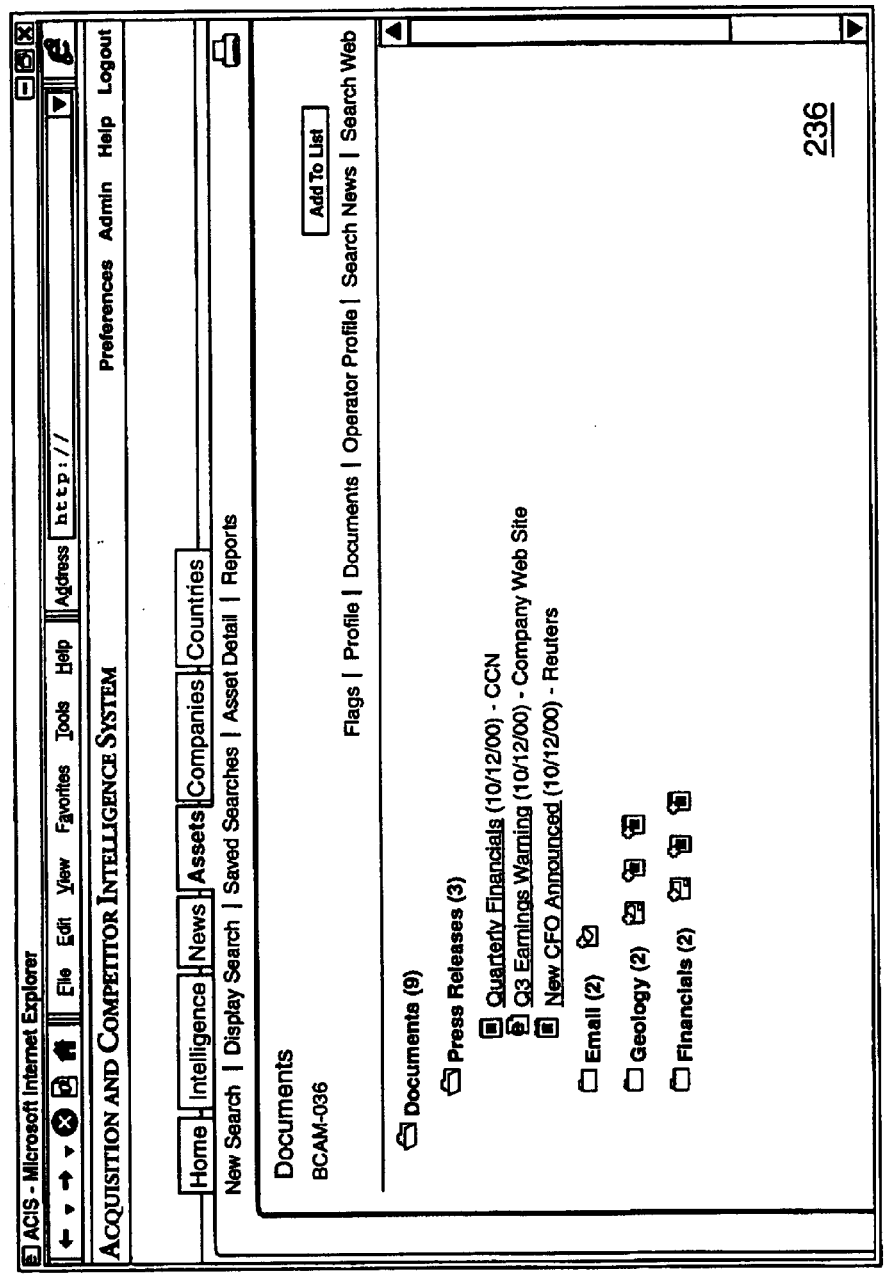
FIG. 10C is an example of a linked documents page displayed to a user in an example implementation of an intelligence system in an embodiment of the present invention.

FIG. 10C illustrates a linked documents page 236 displayed to a user in an example implementation of an intelligence system in an embodiment of the present invention, where a summary of documents linked to an asset is provided to the user, and which allows a user to add, remove, or access linked documents.

Similar flag charts, profile pages, and linked documents pages can be generated by ACIS for different context objects belonging to different context object categories (i.e. companies and countries).

In variant embodiments of the present invention, anything that is associated with or linked to a context object or flag, such as Primary Source Data (e.g. comments), Secondary Source Data, news, documents, files, and electronic mail for example, may also be assigned a priority or importance indicator. These indicators can allow users to indicate that certain information should be treated as more important than others, or that certain information should receive special attention.

In variant embodiments of the present invention, it will be obvious to those skilled in the art that there are numerous possible configurations of the user interfaces and systems described herein. Modifications to the systems to permit secure access to information can be made in known manner. Components of an application server can be distributed across several servers, which may include one or more web servers, if desired. Firewalls may be implemented to prevent unauthorized access of private information.

With respect to elements of the systems described herein, it will be apparent to those skilled in the art that the execution of various tasks associated with the present invention need not be performed by the particular component specified in the description of the preferred and variant embodiments of the invention. For example, it will be obvious to those skilled in the art that the performance of tasks by processing modules may be performed by a single module or by different modules, which may or may not be associated with a single program application. As a further example, it will also be obvious to those skilled in the art that information stored in databases may be distributed across multiple storage means.

A method of the present invention may also be embodied in one or more instructions stored on a computer-readable medium.

The present invention has been described with regard to specific embodiments. However, it will be obvious to persons skilled in the art that a number of variants and modifications can be made without departing from the scope and spirit of the invention defined in the claims appended hereto.

We claim:

1. A method of generating flags for use in an intelligence system, comprising the steps of:
   (a) defining a plurality of flags, wherein each of said plurality of flags has a specific condition associated therewith; and
   (b) storing said plurality of flags in a storage medium, wherein each of said plurality of flags has a flag status indicator associated therewith, and wherein said plurality of flags are searchable by a search engine,
   wherein said plurality of flags comprise a plurality of early warning signals, wherein each early warning signal is a descriptor of a specific condition, and wherein said early warning signal is used to predict the occurrence of specified scenario,
   wherein the plurality of early warning signals are defined at step (a) by performing the following steps:
   (i) identifying a strategic goal;
   (ii) identifying one or more scenarios associated with said strategic goal;
   (iii) identifying one or more examples of past occurrences of at least one of said one or more scenarios;
   (iv) for each of said one or more examples of past occurrences, identifying a plurality of conditions that have been satisfied within a specified period of time prior to the occurrence thereof;
   (v) determining a plurality of reliable indicators that at least one of said one or more scenarios will occur, wherein said plurality of reliable indicators is a subset of said plurality of conditions; and
   (vi) defining a plurality of early warning signals, wherein each of said plurality of early warning signals is a descriptor of a reliable indicator of said plurality of reliable indicators determined in step (v).

2. The method of generating flags as claimed in claim 1, wherein each flag status indicator can be assigned a value representing a status selected from the group consisting of:
   (i) a flagged status, which indicates that the specific condition associated with a flag is satisfied; and
   (ii) an unflagged status, which indicates that the specific condition associated with a flag is not satisfied.

3. The method of generating flags as claimed in claim, 1, wherein each flag status indicator can be assigned a value on a predefined scale.

4. The method of generating flags as claimed in claim 1, wherein each of said plurality of flags is an indicator that can be used by a user to track one or more of the following, in order to provide the user with the opportunity to respond in a timely manner thereto: a pre-specified state, a pre-specified event, a pre-specified action, a pre-specified set of circumstances.

5. The method of generating flags as claimed in claim 1, wherein at least one of said plurality of flags is a value indicator, wherein each value indicator is a descriptor of a specific condition associated with at least one strength of a user organization.

6. A method of generating flags for use in an intelligence system, comprising the steps of:
   (a) defining a plurality of flags, wherein each of said plurality of flags has a specific condition associated therewith; and (b) storing said plurality of flags in a storage medium, wherein each of said plurality of flags has a flag status indicator associated therewith, and wherein said plurality of flags are searchable by a search engine, wherein said plurality of said flags comprises a plurality of value indicators, wherein each value indicator is a descriptor of a specific condition associated with at least one strength of a user organization, wherein the plurality of value indicators are defined at step (a) by performing the following steps:
 (i) identifying a strategic goal;
 (ii) identifying one or more scenarios associated with said strategic goal;
 (iii) identifying one or more strengths of a user organization that provides said user organization with a competitive advantage in achieving said strategic goal under said at least one of said one or more scenarios; and
 (iv) defining a plurality of value indicators, wherein each of said plurality of value indicators is a descriptor of a specific condition associated with at least one of said one or more strengths identified in step (iii).

7. The method of generating flags as claimed in claim 6, wherein each flag status indicator can be assigned a value representing a status selected from the group consisting of:
 (i) a flagged status, which indicates that the specific condition associated with a flag is satisfied; and
 (ii) an unflagged status, which indicates that the specific condition associated with a flag is not satisfied.

8. The method of generating flags as claimed in claim 6, wherein each flag status indicator can be assigned a value on a predefined scale.

9. The method of generating flags as claimed in claim 6, wherein each of said plurality of flags is an indicator that can be used by a user to track one or more of the following, in order to provide the user with the opportunity to respond in a timely manner thereto: a pre-specified state, a pre-specified event, a pre-specified action, a pre-specific set of circumstances.

10. The method of generating flags as claimed in claim 6, wherein at least one of said flags is an early warning signal, wherein each early warning signal is a descriptor of a specific condition, and wherein said early warning signal is used to predict the occurrence of specified scenario.

11. The method of generating flags as claimed in claim 6, wherein each of said one or more strengths is selected from the group consisting of: technical strength, financial strength, organizational strength, and other defined strength.

12. A system for generating flags, said flags for use in an intelligence system, said system comprising:
 (a) a database for storing a plurality of flags;
 (b) a user interface; and
 (c) one or more processing modules connected to said database and said user interface, wherein said one or more processing modules are programmed to define a plurality of flags from information received from a user through said user interface and to store said plurality of flags in said database, wherein each of said plurality of flags has a specific condition associated therewith, and wherein each of said plurality of flags has a flag status indicator associated therewith,
 wherein at least one of said plurality of flags is an early warning signal, wherein each early warning signal is a descriptor of a specific condition, and wherein said early warning signal is used to predict the occurrence of a specified scenario,
 wherein said one or more processing modules are programmed to define a plurality of early warning signals by prompting the user, through said user interface, to:
  (i) identify a strategic goal;
  (ii) identify one or more scenarios associated with said strategic goal;
  (iii) identify one or more examples of past occurrences of at least one of said one or more scenarios;
  (iv) for each of said one or more examples of past occurrences, identify a plurality of conditions that have transpired within a specified period of time prior to the occurrence thereof; and
  (v) determine a plurality of reliable indicators that at least one of said one or more scenarios wilt occur, wherein said plurality of reliable indicators is a subset of said plurality of conditions;
 such that a plurality of early warning signals are defined and stored in said database, wherein each of said plurality of early warning signals is a descriptor of a reliable indicator of said plurality of reliable indicators.

13. The system for generating flags as claimed in claim 12, wherein said plurality of flags are searchable by a search engine.

14. The system for generating flags as claimed if claim 12, wherein each flag status indicator can be assigned a value representing a status selected from the group consisting of:
 (i) a flagged status, which indicates that the specific condition associated with a flag is satisfied; and
 (ii) an unflagged status, which indicates that the specific condition associated with a flag is not satisfied.

15. The system for generating flags as claimed in claim 12, wherein each flag status indicator can be assigned a value on a predefined scale.

16. The system for generating flags as claimed in claim 12, wherein each of said plurality of flags is an indicator that can be used by a user to track one or more of the following, in order to provide the user with the opportunity to respond in a timely manner thereto: a pre-specified state, a pre-specified event, a pre-specified action, a pre-specified set of circumstances.

17. The system for generating flags as claimed in claim 12, wherein at least one of said plurality of flags is a value indicator, wherein each value indicator is a descriptor of a specific condition associated with at least one strength of a user organization.

18. A system for generating flags, said flags for use in an intelligence system, said system comprising:
 (a) a database for storing a plurality of flags;
 (b) a user interface; and
 (c) one or more processing modules connected to said database and said user interface, wherein said one or more processing modules are programmed to define a plurality of flags from information received from a user through said user interface and to store said plurality of flags in said database, wherein each of said plurality of flags has a specific condition associated therewith, and wherein each of said plurality of flags has a flag status indicator associated therewith,
 wherein said plurality of said flags comprises a plurality of value indicators, wherein each value indicator is a descriptor of a specific condition associated with at least one strength of a user organization,
 wherein said one or more processing modules are programmed to define said plurality of value indicators by prompting a user, through said user interface, to:

(i) identify a strategic goal;
(ii) identify one or more scenarios associated with said strategic goal; and
(iii) identify one or more strengths of a user organization that provides said user organization with a competitive advantage in achieving said strategic goal under at least one of said one or more scenarios;
such that a plurality of value indicators are defined and stored in said database, wherein each of said plurality of value indicators is a descriptor of a specific condition associated with at least one of said one or more strengths.

19. The system for generating flags as claimed in claim 18, wherein said plurality of flags are searchable by a search engine.

20. The system for generating flags as claimed in claim 18, wherein each flag status indicator can be assigned a value representing a status selected from the group consisting of:
(i) a flagged status, which indicates that the specific condition associated with a flag is satisfied; and
(ii) an unflagged status, which indicates that the specific condition associated with a flag is not satisfied.

21. The system for generating flags as claimed in claim 18, wherein each flag status indicator can assigned a value predefined scale.

22. The system for generating flags as claimed in claim 18, wherein each of said plurality of flags is an indicator that can be used by a user to track one or more of the following, in order to provide the user with the opportunity to respond in a timely manner thereto: a pre-specified state, a pre-specified event, a pre-specified action, a pre-specified set of circumstances.

23. The system for generating flags as claimed in claim 18, wherein at least one of said plurality of flags is an early warning signal, wherein each early warning signal is a descriptor of a specific condition, and wherein said early warning signal is used to predict the occurrence of a specified scenario.

24. The system for generating flags as claimed in claim 18, wherein each of said one or more strengths is selected from the group consisting of: technical strength, financial strength, organizational strength, and other defined strength.

25. An intelligence system for collecting and analyzing intelligence data relating to one or more predefined context objects, wherein each of said one or more predefined context objects has a plurality of context object attributes associated therewith, said system comprising:
(a) a system database for storing
a plurality of flags wherein each of said plurality of flags is associated with a specific condition, wherein each of said plurality of flags is associated with a context object of said one or more predefined context objects, and wherein each of said plurality of flags has a flag status indicator associated therewith,
a first plurality of data items whereby said first plurality of data items can be characterized as Primary Source data, and
a plurality of context object attributes associated with said plurality of context objects;
(b) a user interface;
(c) one or more processing modules connected to said system database and said user interface, for
displaying at least one flag of a plurality of flags to one or more users through said user interface wherein each of said one or more first users is permitted to assign a value to the specified flag status indicator associated with at least one displayed flag,
receiving said first plurality of data items from one or more users for storage in said system database and associating each of said first plurality of data items with at least one of said plurality of flags or at least one of said one or more context objects, and
receiving a second plurality of data items from one or more data sources and associating each of said second plurality of data items with at least one of said plurality of flags or at least one of said one or more context objects, whereby said second plurality of data items can be characterized as Secondary Source data;
(d) a search engine connected to said system database, said search engine programmed to search at least a subset of searchable data for context objects satisfying search criteria received as input from a user through said user interface, wherein said searchable data comprises context object attributes associated with said plurality of context objects, a plurality of flags and flag status indicators associated therewith, and a first plurality of data items.

26. The intelligence system as claimed in claim 25, wherein said processing modules are further programmed to receive search criteria from a user for use by said search engine, and reporting search results from said search engine to said user for subsequent analysis by said user.

27. The intelligence system as claimed in claim 25, wherein said first plurality of data items comprises one or more of the following: technical information, rumors, gossip, public announcements, news, commentary, other user-entered data.

28. The intelligence system as claimed in claim 25, wherein said system database also comprises links to documents, and wherein each of said documents is associated with at least one of said predefined context objects.

29. The intelligence system as claimed in claim 25, wherein said user interface is adapted to accept input from one or more users through an electronic mall message.

30. The intelligence system as claimed in claim 25, wherein said search criteria is defined to identify context objects which represent desirable acquisition or investment opportunities.

31. The intelligence system as claimed in claim 25, wherein said one or more processing modules are further programmed to monitor a user-defined plurality of context objects.

32. The intelligence system as claimed in claim 25, wherein said searchable data further comprises said second plurality of data items.

33. The intelligence system as claimed in claim 25, wherein said second plurality of data items comprises one or more of the following: press releases, news, data stored in databases, data retrieved from web searches, research data, data retrieved from a data stream, other automated input data, other user-entered data.

34. An intelligence system for collecting and analyzing intelligence data relating to one or more predefined context objects, wherein each of said one or more predefined context objects has a plurality of context object attributes associated therewith, said system comprising:
(a) a system database for storing
a plurality of flags wherein each of said plurality of flags is associated with a specific condition, wherein each of said plurality of flags is associated with a context object of said one or more predefined context objects, and wherein each of said plurality of flags has a flag status indicator associated therewith,
a first plurality of data items whereby said first plurality of data items can be characterized as Primary Source data, and a plurality of context object attributes associated with said plurality of context objects;

(b) a user interlace;

(c) one or more processing modules connected to said system database and said user interlace, for displaying at least one flag of a plurality of flags to one or more users through said user interface wherein each of said one or more first users is permitted to assign a value to the specified flag status indicator associated with at least one displayed flag, and receiving said first plurality of data items from one or more users for storage in said system database and associating each of said first plurality of data items with at least one of said plurality of flags or at least one of said one or more context objects (d) a search engine connected to said system database, said search engine programmed to search at least a subset of searchable data for context objects satisfying search criteria received as input from a user through said user interface, wherein said searchable data comprises context object attributes associated with said plurality of context objects, a plurality of flags and flag status indicators associated therewith, and a first plurality of data items, wherein said search criteria is defined to identify context objects which represent desirable acquisition or investment opportunities associated with the oil and gas industry.

35. The intelligence system as claimed in claim 34, wherein said processing modules are further programmed to receive search criteria from a user for use by said search engine, and reporting search results from said search engine to said user for subsequent analysis by said user.

36. The intelligence system as claimed in claim 34, wherein said first plurality of data items comprises one or more of the following: technical information, rumors, gossip, public announcements, news, commentary, other user-entered data.

37. The intelligence system as claimed in claim 34, wherein said system database also comprises links to documents, and wherein each of said documents is associated with at least one of said predefined context objects.

38. The intelligence system as claimed in claim 34, wherein said user interface is adapted to accept input from one or more users through an electronic mail message.

39. The intelligence system as claimed in claim 34, wherein said one or more processing modules are further programmed to monitor a user-defined plurality of context objects.

40. A system for generating flags comprising:

(a) means for defining a plurality of flags, wherein each of said plurality of flags has a specific condition associated therewith and wherein at least one of said flags is an early warning signal, wherein each early warning signal is a descriptor of a specific condition, and wherein said early warning signal is used to predict the occurrence of a specified scenario;

(b) means for storing said plurality of flags in a storage medium, wherein each of said plurality of flags has a flag status indicator associated therewith, and wherein said plurality of flags are searchable by a search engine, (c) means for identifying a strategic goal;

(d) means for identifying one or more scenarios associated with said strategic goal;

(e) means for identifying one or more examples of past occurrences of at least one of said one or more scenarios;

(f) means for each of said one or more examples of past occurrences, identifying a plurality of conditions, that have been satisfied within a specified period of time prior to the occurrence thereof;

(g) means for determining a plurality of reliable indicators that at least one of said one or more scenarios will occur, wherein said plurality of reliable indicators is a subset of said plurality of conditions; and (h) means for defining a plurality of early warning signals, wherein each of said plurality of early warning signals is a descriptor of a reliable indicator of said plurality of reliable indicators.

41. The system for generating flags as claimed in claim 40, wherein each flag status indicator can be assigned a value representing a status selected from the group consisting of:

(i) a flagged status, which indicates that the specific condition associated with a flag is satisfied; and (ii) an unflagged status, which indicates that the specific condition associated with a flag is not satisfied.

42. The system for generating flags as claimed in claim 40, wherein each flag status indicator can be assigned a value on a predefined scale.

43. The system for generating flags as claimed in claim 42, wherein each of said plurality of flags is an indicator that can be used by a user to track one or more of the following, in order to provide the user with the opportunity to respond in a timely manner thereto: a pre-specified state, a pre-specified event, a pre-specified action, a pre-specified set of circumstances.

44. The system for generating flags as claimed in claim 40, wherein at least one of said plurality of flags is a value indicator, wherein each value indicator is a descriptor of a specific condition associated with at least one strength of a user organization.

45. A system for generating flags comprising:

(a) means for defining a plurality of flags, wherein each of said plurality of flags has a specific condition associated therewith and wherein at least one of said plurality of flags is a value indicator, wherein each value indicator is a descriptor of a specific condition associated with at least one strength of a user organization; and (b) means for storing said plurality of flags in a storage medium, wherein each of said plurality of flags has a flag status indicator associated therewith, and wherein said plurality of flags are searchable by a search engine;

(c) means for identifying a strategic goal;

(d) means for identifying one or more scenarios associated with said strategic goal;

(e) means for identifying one or more strengths of a user organization that provides said user organization with a competitive advantage in achieving said strategic goal under said at least one of said one or more scenarios; and (f) means for defining a plurality of value indicators, wherein each of said plurality of value indicators is a descriptor of a specific condition associated with at least one of said or more strengths identified with means (e).

46. The system for generating flags as claimed in claim 45, wherein each flag status indicator can be assigned a value representing a status selected from the group consisting of:

(i) a flagged status, which indicates that the specific condition associated with a flag is satisfied; and (ii) an unflagged status, which indicates that the specific condition associated with a flag is not satisfied.

47. The system for generating flags as claimed in claim 45, wherein each flag status indicator can be assigned a value on a predefined scale.

48. The system for generating flags as claimed in claim 47, wherein each of said plurality of flags is an indicator that can be used by a user to track one or more of the following, in order to provide the user with the opportunity to respond in a timely manner thereto: a pre-specified state, a pre-specified event, a pre-specified action, a pre-specified set of circumstances.

49. The system for generating flags as claimed in claim 45, wherein at least one of said flags is an early warning signal, wherein each early warning signal is a descriptor of a specific condition, and wherein said early warning signal is used to predict the occurrence of a specified scenario.

50. The system for generating flags as claimed in claim 45, wherein each of said one or more strengths is selected from the group consisting of: technical strength, financial strength, organizational strength, and other defined strength.

* * * * *